(12) United States Patent
Jian et al.

(10) Patent No.: US 12,549,223 B2
(45) Date of Patent: Feb. 10, 2026

(54) SURFACE ELEMENT SEGMENTATION AND NODE GROUPING FOR INTELLIGENT REFLECTING DEVICES

(71) Applicant: ZTE Corporation, Shenzhen (CN)

(72) Inventors: Mengnan Jian, Shenzhen (CN); Yajun Zhao, Shenzhen (CN); Yijian Chen, Shenzhen (CN); Ruiqi Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 487 days.

(21) Appl. No.: 18/147,290

(22) Filed: Dec. 28, 2022

(65) Prior Publication Data

US 2023/0146485 A1 May 11, 2023

Related U.S. Application Data

(63) Continuation of application No. PCT/CN2020/099884, filed on Jul. 2, 2020.

(51) Int. Cl.
*H04B 7/04* (2017.01)
*H04B 7/155* (2006.01)

(52) U.S. Cl.
CPC ..... *H04B 7/04013* (2023.05); *H04B 7/15507* (2013.01); *H04B 7/1555* (2013.01)

(58) Field of Classification Search
CPC .. H04B 7/04013; H04B 7/15507; H04B 7/15; H04B 7/1555; H04B 7/14
See application file for complete search history.

(56) References Cited

U.S. PATENT DOCUMENTS

| | | | |
|---|---|---|---|
| 2010/0265842 | A1 | 10/2010 | Khandekar et al. |
| 2014/0078970 | A1 | 3/2014 | Guo et al. |
| 2015/0003370 | A1 | 1/2015 | Yokomakura et al. |

(Continued)

FOREIGN PATENT DOCUMENTS

| | | |
|---|---|---|
| CN | 110225538 A | 9/2019 |
| CN | 110266352 A | 9/2019 |

(Continued)

OTHER PUBLICATIONS (CN 106876982 A),Zhao et al., Super-surface Improves Performance of Multiple Antenna System and Antenna System Uses Super Surface of, Jun. 2017, pp. 1-9 (Year: 2017).*

(Continued)

*Primary Examiner* — Keith Ferguson
(74) *Attorney, Agent, or Firm* — Crowell & Moring LLP

(57) ABSTRACT

This document generally relates to wireless communication systems that involve one or more intelligent reflecting devices. A plurality of second nodes that communicate with a first node may be grouped into node groups based on one or more communication parameters between the plurality of second nodes and an intelligent reflecting device. In turn, the first node may transmit signals to the plurality of second nodes via the intelligent reflecting device according to a time schedule based on the node grouping. In addition or alternatively, an intelligent reflecting device may include surface elements that are divided into multiple surface element regions. The first node may communicate with the multiple surface element regions independently in order to service the plurality of second nodes.

18 Claims, 8 Drawing Sheets

(56) References Cited

U.S. PATENT DOCUMENTS

| | | | |
|---|---|---|---|
| 2019/0363447 | A1 | 11/2019 | Peletti et al. |
| 2023/0208479 | A1* | 6/2023 | Wang .................. H04B 7/0617 375/262 |

FOREIGN PATENT DOCUMENTS

| | | |
|---|---|---|
| CN | 110278017 A | 9/2019 |
| CN | 111050277 | 4/2020 |
| CN | 111093267 A | 5/2020 |
| CN | 111131096 A | 5/2020 |
| CN | 111163515 A | 5/2020 |
| CN | 111211824 A | 5/2020 |
| CN | 111245493 A | 6/2020 |
| CN | 111355519 A | 6/2020 |
| CN | 115669108 A | 1/2023 |
| JP | 2012-525068 | 10/2012 |
| JP | 2013-172169 | 9/2013 |
| RU | 2170492 C2 | 7/2001 |
| WO | WO 2010/124031 A2 | 10/2010 |
| WO | WO 2021/109345 A1 | 6/2021 |

OTHER PUBLICATIONS (CN 101427486 B), Alamouti et al., Millimeter-wave Communication System With Directional Antenna and One or More Millimeter-wave Reflectors, Jun. 2013, pp. 1-11 (Year: 2013).*

Office Action issued in Canadian Patent Application No. 3,184,404, dated Sep. 23, 2024, 5 pages.

International Search Report and Written Opinion for International Application No. PCT/CN2020/099884 mailed Apr. 2, 2021 (7 pages).

Guanghua Yu et al., "*Large Intelligent Reflecting Surface Enhanced Massive Access for B5G Cellular Internet of Things*", 2020 IEEE 91$^{st}$ Vehicluar Technology Conference, Jun. 30, 2020 (5 pages).

Yuze Zou, et al., "*Joint Energy Beamforming and Optimization for Intelligent Reflecting Surface* Enhanced Communications", 2020 IEEE Wireless Communications and Networking Conference Workshops (WCNCW), Jun. 25, 2020 (7 pages).

Zhaorui Wang et al., "*Intelligent reflecting surface design for 6G-assisted Internet of Things*", Chinese Journal of Internet of Things, vol. 4, No. 2, Jun. 30, 2020 including English translation of Abstract (12 pages).

Korean-language Office Action issued in Korean Application No. 10-2023-7000052 dated Dec. 24, 2024 with English summary (8 pages).

Chinese-language Search Report issued in Chinese Application No. 2020801018345 dated Dec. 23, 2024 with partial English translation (4 pages).

Chinese-language Office Action issued in Chinese Application No. 202080101834.5 dated Dec. 26, 2024 with English translation (26 pages).

Chen, Jie et al., "Intelligent Reflecting Surface: A Programmable Wireless Environment for Physical Layer Security", *IEEE Access*, vol. 7, Jun. 20, 2019, section II (14 pages).

Wang, Zhaorui et al. "Channel Estimation for Intelligent Reflecting Surface Assisted Multiuser Communications: Framework, Algorithms, and Analysis", *IEEE Transactions on Wireless Communications*, vol. 19, No. 10, Jun. 30, 2020, section I (13 pages).

International Search Report and Written Opinion for International Application No. PCT/CN2020/099869 mailed Mar. 31, 2021 (6 pages).

Supplementary European Search Report for Application No. 20 94 2636 mailed Jul. 27, 2023 (9 pages).

Japanese-language Office Action issued in Japanese Application No. 2022-546008 dated Dec. 28, 2023 with English translation (11 pages).

Extended European Search Report for Application No. 20943813.4 dated Jul. 5, 2023 (13 pages).

Indian Examination Report for Application No. 202317000102 dated Dec. 30, 2023, including English translation (3 pages).

Russian Office Action for Application No. 2022135093/07(076104) dated Apr. 13, 2023, including English translation (9 pages).

* cited by examiner

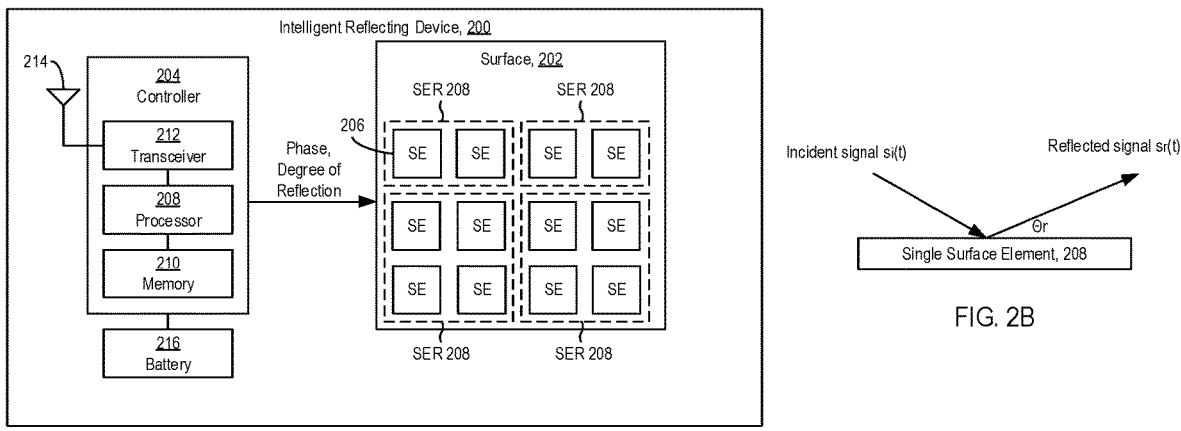
FIG. 2A
FIG. 2B
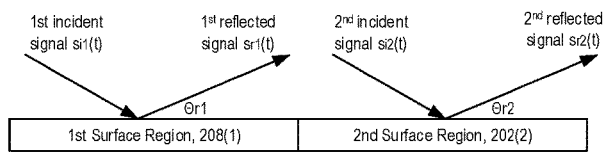
FIG. 2C surface element groups for node group 1 surface element groups for node group 2

SURFACE ELEMENT SEGMENTATION AND NODE GROUPING FOR INTELLIGENT REFLECTING DEVICES

TECHNICAL FIELD

This document is directed generally to intelligent reflecting devices in wireless communications.

BACKGROUND

Some of the greatest challenges that are faced in wireless communication as network capacity density greatly increases include increased complexity, hardware costs, and energy consumption. For example, increasing base stations in ultra-dense networking environments may increase hardware and maintenance costs, and/or may encounter severe network interference issues. Additionally, the spectrum spread from sub-6G to millimeter or even terahertz waves requires more complex signal processing and higher-cost energy-consuming hardware. Another or related challenge in wireless communications, especially for 5G, 6G and beyond, is to be able to serve very large numbers of user devices simultaneously, such as an extension of massive Machine Type Communications (mMTC). Ways to overcome these challenges for future wireless communication environments may be desirable.

SUMMARY

This document relates to methods, systems, apparatuses and devices for use of intelligent reflecting devices in wireless communications. In some implementations, a method is disclosed. The method may include: assigning, by a node group assignment node, each of a plurality of second nodes to one of a plurality of node groups based on one or more communication parameters between the plurality of second nodes and an intelligent reflecting device; determining, by a first node, a plurality of signals to transmit to the plurality of second nodes, and a timing schedule according to which to transmit the plurality of second signals, wherein the timing schedule: identifies a plurality of time slots, indicates to transmit signals for receipt by second nodes of a same node group in a same time slot, and indicates to transmit signals for receipt by second nodes of different node groups in different time slots; and transmitting, by the first node, the plurality of signals to the intelligent reflecting device according to the timing schedule.

In some other implementations a method is disclosed. The method may include: determining, by a region determination node, a plurality of surface element regions of a plurality of surface elements of an intelligent reflecting device; independently setting, by at least one of the first node or the intelligent reflecting device, communication parameters for respective communications between the first node and each of the plurality of surface element regions; and transmitting, by the first node, signals to a plurality of second nodes via the plurality of surface element regions according to the independent setting of the communication parameters.

In some other implementations, a system including one or more network devices is disclosed. The one or more network devices may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causes the one or more processors to implement any one of the methods above.

The above and other aspects and their implementations are described in greater detail in the drawings, the descriptions, and the claims.

BRIEF DESCRIPTION OF THE DRAWINGS

FIG. 2A shows a block diagram of an example intelligent reflecting device.

FIG. 2B shows a diagram of a surface of an intelligent reflecting device reflecting an incident signal.

FIG. 2C shows a diagram of a surface reflecting with multiple reflection angles.

DETAILED DESCRIPTION

Figure 1:
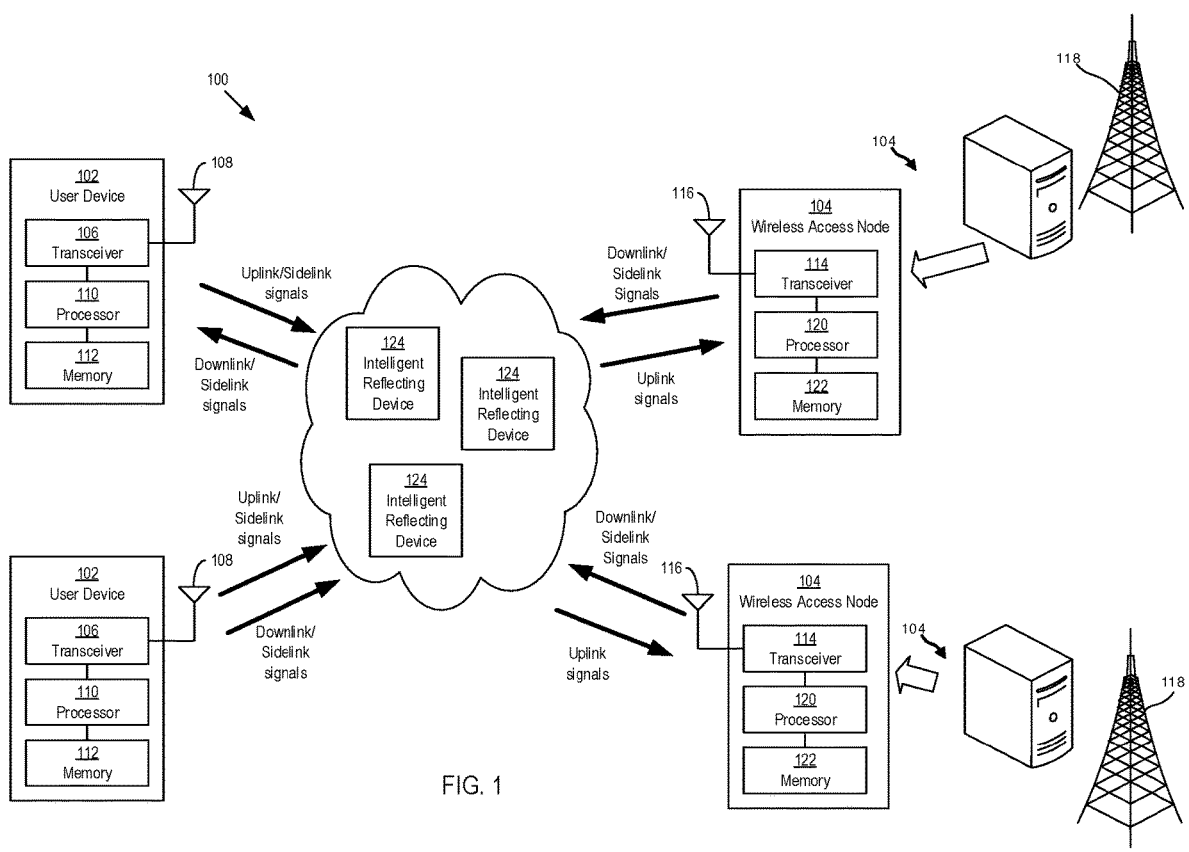
FIG. 1 shows a block diagram of an example of a wireless communication system.

The present description describes various embodiments of systems, apparatuses, devices, and methods for wireless communications involving one or more intelligent reflecting devices. In such embodiments, a first node may communicate with one or more second nodes via the one or more intelligent reflecting devices. For example, the first node may transmit signals to the one or more intelligent reflecting devices, and the one or more intelligent reflecting devices reflects the signals toward the second nodes.

In various embodiments, the second nodes may be grouped into node groups based on one or more communication parameters between the second nodes and an intelligent reflecting device. The first node may transmit signals in a same time slot, via the intelligent reflecting device, to second nodes in the same node group, and may transmit signals in different time slots, via the intelligent reflecting device, to second nodes in different node groups.

Additionally, in various embodiments, surface element regions of surface elements of an intelligent reflecting device may be determined, and a first node may transmit signals to second nodes via the intelligent reflecting device according to the surface element regions. For example, the first node and/or the intelligent reflecting device may independently set communications parameters for respective communications between the first node and the surface element regions.

Additionally, in various embodiments, the first node may communicate with the second nodes via multiple intelligent reflecting devices. In such embodiments, for each of the second nodes, a target intelligent reflecting device via which the first node is to communicate with a particular second node may be determined or selected. Node grouping and/or surface element region determination may then be performed for subsets of second nodes that are associated with the same target intelligent reflecting device.

Additionally, in various embodiments, the first node may communicate with a plurality of second nodes via a plurality or a chain of multiple intelligent reflecting devices. For example, the first node may transmit a signal to a first intelligent reflecting device in the chain, the first intelligent reflecting device reflects the signal to a second intelligent reflecting in the chain, and so on, until a last intelligent reflecting device reflects the signal to a given second node. For such embodiments, channel state information may be obtained through channel estimation, beam training or sweeping, or a combination thereof, depending on whether and/or which of the intelligent reflecting devices in the chain have sensing ability and which do not. In addition or alternatively, a scheme of relatively low complexity may be implemented where node grouping and/or surface element region determination is performed for, and/or based on, only the last intelligent reflecting device in the chain.

The various embodiments described herein provide improved and more efficient ways, including improved and more efficient allocation of resources (including time-domain and space-domain resources), for a first node to communicate with a plurality of second nodes in a wireless communication system via one or more intelligent reflecting devices, and/or may allow for the first node to effectively communicate with larger numbers of second nodes via one or more intelligent reflecting devices. Such improvements and enhanced efficiencies may be realized through surface element grouping and/or region determination, node grouping, channel state information acquisition, utilization of angle domain information, utilization of channel reciprocity, utilization of location information, utilization of service (e.g., QoS) requirements, or any various combinations thereof, as described in further detail below. Additionally, separating the surface elements of an intelligent reflecting device into regions may improve spatial degrees of freedom. Moreover, tradeoffs between complexity and efficiency may be determined for communication via multiple intelligent reflecting devices in parallel or in cascade (series). Details of the various embodiments are the advantages, benefits, and improvements that may result through implementation of the various embodiments are described in further detail below with reference to the accompanying figures.

FIG. 1 shows a diagram of an example wireless communication system 100 including a plurality of communication nodes (or just nodes) that are configured to wirelessly communicate with each other. In general, the communication nodes include at least one user device 102 and at least one wireless access node 104. The example wireless communication system 100 in FIG. 1 is shown as including two user devices 102 and two wireless access nodes 104. However, various other examples of the wireless communication system 100 that include any of various combinations of user devices 102 and wireless access nodes 104, including only one user device 102 and only one wireless access node 104, only one user device 102 and two or more wireless access nodes 104, two or more user devices 102 without any wireless access nodes 104, two or more user devices 102 and one or more wireless access nodes 104, or two or more wireless access nodes 104 without any user devices 102.

The user device 102 may include a single electronic device or apparatus, or multiple (e.g., a network of) electronic devices or apparatuses, capable of communicating wirelessly over a network. A user device may comprise or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, a wireless access node 104 may also include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a sending node or a sending device, the second node may be referred to as a receiving node or a receiving device, and the communication may be considered a transmission for the first node and a reception for the second node. Of course, since communication nodes in a wireless system 100 can both send and receive signals, a single communication node may be both a sending node and a receiving node simultaneously or switch between being a sending node and a receiving node.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a mobile station 102. A sidelink signal is a signal transmitted from a first user device 102 to a second user device 102, or a signal transmitted from a first wireless access node 104 to a second wireless access node 104.

In addition, the wireless communication system 100 may further include, or be in communication with, a network of one or more intelligent reflecting devices 124. As used herein, an intelligent reflecting device is a device having a surface that can reflect a signal, and that has one or more variable reflection angles. An intelligent reflecting device, and/or the intelligent reflecting device's surface, may also, or otherwise, be referred to as an intelligent reflecting surface (IRS), a large intelligent surface (LIS), a large intelligent metasurface (LIM), smart reflect-arrays, a reconfigurable intelligent surface (RIS), a software-defined surface (SDS), a software-defined metasurface (SDM), a passive intelligent surface (PIS), or passive intelligent mirrors.

In general, a surface of an intelligent reflecting device receives an incident signal and reflects the incident signal. The signal that the surface outputs in response to, or as a result of, the reflection is referred to as a reflected signal. In other words, a reflected signal is a reflected version of an incident signal reflected by a surface.

In addition, a surface of an intelligent reflecting device may be configured to reflect signals with one or more variable reflection angles. A reflection angle is an angle at which a surface outputs a reflected signal. A reflection angle may be determined or measured relative to the surface of the intelligent reflecting device, or a line perpendicular to the surface. Additionally, a variable reflection angle is a reflection angle that has an amount or value that can vary over time. Accordingly, at any time, an intelligent reflecting device can change, or keep the same, the amount of the reflection angle.

Also, in various embodiments, an intelligent reflecting device may simultaneously reflect multiple signals, each with a respective one of multiple variable reflection signals. As described in further detail below, in various embodiments, a surface of an intelligent reflecting device may be separated or divided into multiple portions or regions. Each region may be configured to reflect an incident signal with an associated variable reflection angle. At any given time, different regions may reflect incident signals with associated variable reflection angles that are the same as or different from each other. The intelligent reflecting device may be configured to independently control or set the variable reflection angles of the different regions at various times.

In addition, for at least some embodiments, a surface of an intelligent reflecting device may be configured to reflect an incident signal with a variable reflection magnitude. In general, a reflection magnitude is or indicates an amount of power of the incident signal that the surface reflects. The reflection magnitude may be a value in units of power (such as Watts), or may be represented as a percentage or a fraction of the power of the incident signal. The reflection magnitude may be inversely related to an amount of energy of a signal that the surface absorbs upon receipt and reflection of the signal. Also, a variable reflection magnitude is a reflection magnitude that has an amount or value that can vary over time. Accordingly, at any time, an intelligent reflecting device can change, or keep the same, the amount of the reflection magnitude.

Also, in various embodiments, an intelligent reflecting device may simultaneously reflect multiple signals, each with a respective one of multiple reflection magnitudes. In particular, each region of multiple regions of a surface of an intelligent reflecting device may reflect an incident signal with an associated variable reflection magnitude. At any given time, the different regions may reflect incident signals with associated variable reflection magnitudes that are the same as or different from each other. The intelligent reflecting device may be configured to independently control or set the variable reflection magnitudes of the different regions at various times.

In further detail, FIG. 2A shows a block diagram of an example configuration of an intelligent reflecting device 200, which is representative of an example configuration of an intelligent reflecting device 124 in FIG. 1. The intelligent reflecting device 200 includes a surface 202 and a controller 204. The surface 202 includes a plurality of surface elements (SE) (also called surface units (SU)) 206. For simplicity, FIG. 2A shows twelve surface elements 206. However, any numbers of surface elements 206 are possible in any of various embodiments, including numbers in the hundreds, thousands, tens of thousands, or higher. In general, a surface element 206 of the surface 202 of the intelligent reflecting device 200 is a smallest unit or portion of the surface having an associated variable reflection angle. Accordingly, the intelligent reflecting device 200 may be configured such that any two surface elements 206 may have their respective variable reflection angles set or controlled independent of each other.

Also, each surface element 206 may have an associated variable phase shift with which it reflects an incident signal. The amount of phase shift may in turn determine the amount of the reflection angle. Accordingly, the intelligent reflecting device 200 may set the associated phase shift of a given surface element 206 to a certain amount in order to effect a certain amount of reflection angle associated with the given surface element 206. In addition, the intelligent reflecting device 200 may change the phase shift from one amount to a second amount in order to effect a corresponding change of the reflection angle.

Also, the surface elements 206 of the surface element 202 may be divided, separated, or grouped together into one or more surface element regions (SER) 208. In general, a surface element region is a group or a set of one or more surface elements 206. For purposes of illustration, FIG. 2A shows four surface element regions 208, although in any of various embodiments, the surface 202 can have its surface elements 206 divided into any number of one or more surface regions 208. Also, for at least some embodiments, one surface element 208 may be in only one surface element region 208 at any given point in time.

Additionally, in some embodiments, a surface element region 208 is fixed, i.e., the one or more surface elements that form the surface element region 208 is constant or unchangeable. In other embodiments, a surface element region 208 is variable or configurable. That is, a combination of one or more surface elements 206 can change at different points in time. In turn, the numbers, shapes, and/or sizes of surface element regions 208 of the surface 202 may change at different points in time. For example, FIG. 2A shows four surface element regions 208, including two surface element regions 208 each with two surface elements 206, and two surface element regions 208 each with four surface elements 206. At another point in time, the intelligent reflecting device 200 may divide the twelve surface elements 206 into two surface element regions 208 each with six surface elements 206, or may divide the twelve surface elements 206 into two surface element regions 208 but with unequal numbers, or may keep group all of the twelve surface elements 206 into one surface element region 208, as non-limiting examples. Also, in various embodiments, and/or at any of various times, a given surface element 206 may not be part of any surface element region 206.

In addition, surface elements 206 may be assigned to a given surface element region 208 to configure the given surface element region 208 with a particular shape, size, and/or for the surface element region 208 to have a particular position or cover a certain area of the surface 202. Any of various shapes that can be formed with one or more surface elements 206 of the surface 202 may be possible, such as rectangular or polygonal, star-shaped, elliptical, amorphous, or any other type of shape. Also, a size of a given surface element region 208 may depend on, or be equal to, a number of surface elements 206 of the given surface element region 208. Accordingly, at any of various times where the surface element regions 206 are divided into multiple surface element regions 208, any two surface element regions 208 may have the same as or different sizes and/or shapes from each other. Additionally, in various embodiments, a given surface element region 208 may be contiguous or non-contiguous (e.g., a given surface region 208 includes two or more portions that are unconnected with each other). In various embodiments or at any of various times, the surface element regions 208 of the surface may all be contiguous, may all be non-contiguous, or may a combination of contiguous and non-contiguous.

In general, each surface element region 208 may have an associated variable reflection angle, and the intelligent reflecting device 200 may be configured to independently set, control, and/or change the variable reflection angles for each of the surface element regions 208. Accordingly, the intelligent reflecting device 200 may independently determine reflection angles for the different surface element regions, and in turn, set the phase shifts of the different surface elements 206 of the different surface element regions 208 in order for the different surface element regions 208 to be configured to reflect, including simultaneously reflect, respective incident signals with their respective reflecting angles.

As one example illustration, FIG. 2B shows the surface 202 with its surface elements configured as a single surface element region 208 that reflects an incident signal $s_i(t)$ to output a reflected signal $s_r(t)$ at a reflection angle $\Theta_r$. The intelligent reflecting device 200 may determine an amount of the reflection angle $\Theta_r$, and in turn set the phase shifts of the surface elements 206 that are part of the single surface element region 208 so that the single surface element region 208 outputs the reflected signal $s_r(t)$ with the reflection angle $\Theta_r$ at the determined amount.

As another example illustration, FIG. 2C shows the surface 202 with its surface elements configured as two surface element regions 208(1) and 208(2). The intelligent reflecting device 200 may independently determine amounts for a first reflection angle $\Theta_{r1}$ for the first surface region 208(1) and for a second reflection angle $\Theta_{r2}$ for the second surface region 208(2). In turn, the intelligent reflecting device 200 may set phase shifts for the surface elements 206 in the first and second surface element regions 208(1), 208(2) so that the first surface element region 208(1) reflects a first incident signal $s_{i1}(t)$ and outputs a first reflected signal $s_{r1}(t)$ at the first reflection angle $\Theta_{r1}$, and the second surface element region 208(2) reflects a second incident signal $s_{i2}(t)$ and outputs a second reflected signal $s_{r2}(t)$ at the second reflection angle $\Theta_{r1}$.

Referring back to FIG. 2A, in general, the controller 204 is configured to control the surface 202 and the surface elements 206. As part of its control functionality, the controller 204 may configured to perform any of various functions and/or make any of various determinations in order for the surface elements 204 to reflect with certain reflection angles. As examples, the controller 204 may determine surface element regions 208, and determine which surface element region 208 to which each of the surface elements 206 belongs, and/or assign each surface element 206 to a surface element region 208. In addition or alternatively, the controller 204 determines reflection angles for each of the surface element regions 208, and is configured to set the phase shifts of the surface elements 206 so that the surface element regions 208 reflect according to the determined reflection angles. Additionally, the controller 204 may control the surface 202 and/or the surface elements 206 to control the reflection magnitudes according to which the surface elements 206 reflect incident signals. Also, in various embodiments, the controller 204 may be configured to determine and/or set any of various communication parameters associated with receiving incident signals and/or outputting reflected signals for communication between other nodes in the wireless communication system 100. As non-limiting examples, the controller 204 may be configured to determine channel state information and/or received signal power related to incident signals that the intelligent reflecting device 200 receives and/or reflected signals that the intelligent reflecting device 200 outputs. Additional functionality associated with the controller 204 is described in further detail below.

Similar to the communication nodes in FIG. 1, the controller 204 may include a processor 208 and a memory (or other storage device) 210. In various embodiments, the memory 210 may store therein instructions or code that, when read and executed by the processor 208, cause the processor 208 to perform any of various functions and/or any of various methods described herein.

Additionally, for at least some example configurations, the controller 204 includes transceiver circuitry 212 configured to communicate, including sending and receiving, signals and/or information with one or more other communication nodes in the wireless communication system 100. For some example embodiments, such as shown in FIG. 2A, the intelligent reflecting device 200 includes an antenna 214 coupled to the transceiver 212 through which the intelligent reflecting device 200 wirelessly communicates with the other communication nodes. In addition or alternatively, the intelligent reflecting device 200, by way of the transceiver 212, may be configured to communicate with one or more other communication nodes through one or more wired connections, such as with electrical wires or cabling electrically connecting the intelligent reflecting device 200 with the one or more other communication nodes. Accordingly, in various embodiments, the intelligent reflecting device 200 can externally communicate with one or more communication nodes, wirelessly, though wired connections, or a combination thereof.

Referring back to FIG. 1, the present description describes node grouping and surface element region division schemes or strategies for communication between a first node and a plurality of second nodes via an intelligent reflecting device 124. The node grouping and/or surface element region division schemes described below may allow extremely large (massive) numbers of second nodes to receive signals, and/or be serviced, from or by a first node, through use of an intelligent reflecting device 124 with low time-frequency resource usage, minimum time-frequency resource cost, high spectrum efficiencies, and/or high data transmission quality, making them desirable schemes to employ when using intelligent reflecting device 124 for wireless communications between wireless access nodes.

Any of various combinations of one or more user devices 102 and/or one or more wireless access nodes 104 for the first node and the plurality of second nodes may be possible. In particular embodiments, the first node is a wireless access node 104, the plurality of second nodes are user devices 102, and the communications between the first node and the plurality of second nodes are downlink transmissions, where the wireless access node 104 transmits downlink signals to the plurality of user devices 102 by way of an intelligent reflecting device 124. However, in other embodiments, the first node may be a user device 102 and the plurality of second nodes 104 may be wireless access nodes 104, where the user device 102 transmits uplink signals to the wireless access nodes 104 by way of an intelligent reflecting device 124. In still other embodiments, the first node and the plurality of second nodes are all user devices 102, or the first node and the plurality of second nodes are all wireless access nodes 104, where the first user device 102 transmits sidelink signals to the plurality of second nodes via an intelligent reflecting device 124. In yet other embodiments, the first node is a user device 102 or a wireless access node 104, and the plurality of second nodes includes a combination of one or more user devices 102 and one or more wireless access nodes 104, such that the communications between the first node and the plurality of second nodes includes a combination of one or more uplink transmissions and one or more sidelink transmissions, or a combination of one or more downlink transmissions and one or more sidelink transmissions.

Figure 3:
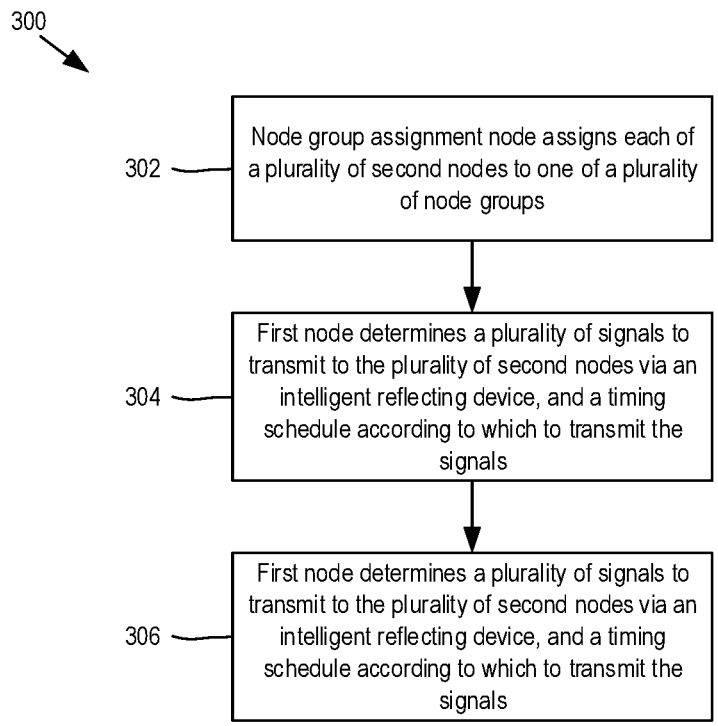
FIG. 3 shows a flow chart of an example wireless communication method that includes node grouping.

FIG. 3 shows an example method 300 for wireless communication that includes node grouping. In general, when a first node intends to communicate with a plurality of second nodes, the first node may determine a plurality of node groups in which each second node may belong and/or into which each second node may be assigned. A node group is a group or a collection of one or more second nodes that the first node transmits to in or during a single or common time slot. For a given set of second nodes in the same node group, the first node may determine to transmit signals to those second nodes in the same node group in or during a same time slot. Additionally, for given set of nodes in different node groups, the first node may determine to transmit signals to those nodes in or during different time slots.

In general, a time slot is a unit of time defined in the time domain for a transmission. The parameters defining a time slot may be determined according to a communication standard or specification under which the nodes in a wireless communication system communicate. In various embodiments, a time slot may be a portion of a subframe, and may have a predetermined number of symbols, such as orthogonal frequency division multiplexing (OFDM) symbols. For example, in 5G NR, a subframe may be divided into time slots, where each time slot includes fourteen OFDM symbols. Various other ways of defining a time slot may be possible.

Upon determining a plurality of node groups, the first node may know which node group in which each second node belongs. Accordingly, upon determining a plurality of node groups, the first node may know the node group to which each of the second nodes belongs. In turn, the first node may know in which time slot to transmit signals to the various second nodes via an intelligent reflecting device 124 based on which node group to which each of the second nodes belongs.

In further detail, at block 302, a node group assignment node may assign each of the plurality of second nodes to one of a plurality of node groups based on one or more communication parameters between the plurality of second nodes and an intelligent reflecting device. In general, a node group assignment node may be any communication node responsible for assigning the second nodes to one or more node groups. An assigning node may be the first node that is to transmit signals to the second nodes, a second node that is to receive a signal from the first node via an intelligent reflecting device, the intelligent reflecting device, another communication node otherwise not involved in communication between the first node and the plurality of second nodes via the intelligent reflecting device, or any of various combinations thereof.

Also, in general as used herein, a communication parameter is any information that can characterize or describe a communication between two nodes. Non-limiting examples of a communication parameter include signal power (including received signal power and/or transmitted signal power); channel state information, location information of a node (including where a node is located relative to another node or a distance that one node is from another node); surface element group information and overlap information associated with the surface element group information (described in further detail below); a node type (e.g., a type of the second node), a beam, including a selected beam selected from among a plurality of beams (including a transmit beam used to transmit a signal and/or a receive beam used to receive a signal), or any other of various parameters related to or that can describe or characterize a communication between two nodes (including target parameters according to which two nodes are to communicate with each other, and/or actual or measured parameters determined from one or more communications between two nodes), non-limiting examples include: signal-to-noise ratio (SNR), signal-to-interference-plus-noise ratio (SINR), data rate (or data transmission rate), capacity, signal gain, signal energy, or angle (or angle-domain) information, or quality of service (QoS) parameters.

Additionally, in at least some example embodiments, each second node may have an associated surface element group of surface elements 206. In the wireless system 100, one or more of the nodes, designated as a surface element group determination node, may determine the surface element groups for the second nodes. The surface element group determination node may be any of various nodes in the wireless communication system, such as an intelligent reflecting device 124, the first node, one of the second nodes, or combinations thereof.

In particular embodiments, the surface element group determination node may determine the surface element groups for the second nodes based on received signal powers of the surface elements 206 of an intelligent reflecting device 124. In various embodiments, the received signal power of a given surface element 206 may be characterized or quantified in any of various ways, including an absolute power value, a power ratio of a received signal power for the given surface element 206 to the received signal powers for all of the surface element 206, a ratio of the received signal power for the given surface element 206 to a total signal power, or a comparison power ratio between the received signal power for the given surface element 206 and one or more received signal power for one or more other surface elements 206.

The surface element group determination node may determine a surface element group for a given second node by identifying a set of one or more surface elements 206, of the surface elements 206 of the surface 202. A surface element group of a given second node may include those surface elements 206 of the surface 202 of an intelligent reflecting device 124 that have received signal powers above a power threshold when communicating with the given second node. Accordingly, in order to determine a surface element group for a given second node, the surface element group determination node may determine a given surface element 206 to be part of the surface element group, or to add the surface element 206 to the surface element group, for the given second node if the surface element group determination node determines that the given surface element 206 has a received signal power associated with the given second node above a threshold power level. In addition, if the surface element group determination node determines that the given surface element 206 does not have a received signal power associated with the given second node above the threshold power level, then the surface element group determination node may determine not to add the given surface element 206 to the surface element group for the given second node.

Additionally, in various embodiments, the surface element group determination node may use one or more other or additional criteria to determine a surface element group for a given second node. The one or more other or additional criterial may include a predetermined maximum number of surface elements, and/or a predetermined minimum number of surface elements. For example, if the received signal power for a given surface element 206 satisfies the power threshold, but a number of surface elements 206 added to the surface element group for the given second node has already reached the predetermined maximum number of surface elements, then the surface element group determination node may determine not to add the given surface element 206 to the surface element group so as not to exceed the predetermined maximum number. In addition or alternatively, if the received signal power for the given surface element 206 does not satisfy the power threshold, but a number of surface elements 206 added to the surface element group for the given second node is below a predetermined minimum number of surface elements, the surface element group determination node may determine to add the given surface element 206 to the surface element in order to meet the predetermined minimum number.

For at least some embodiments, the surface element group determination node may determine the received signal powers based on channel state information. In various embodiments, the intelligent reflecting device 124, such as through use of its controller 204, may have sensing ability, which allows the intelligent reflecting device 124 to obtain the channel state information through channel estimation algorithms, such as least squares (LS) or minimum mean square error (MMSE). The intelligent reflecting device 124 may determine channel state information for different second nodes may by performing channel estimation in different time slots. Additionally, if a channel is sparse, the intelligent reflecting device 124 may use advanced signal processing techniques, such as compressive sensing, which may be particularly advantageous in mmWave and/or terahertz frequency bands. In other embodiments, the intelligent reflecting device 124 may not have sensing ability, and the surface element group determination node may determine the channel state information using beam searching and/or beam training techniques to perform channel estimation. For example, for downlink transmissions, a codebook for the wireless access node 104 and the intelligent reflecting device 124 may be fixed, and a beam training process may be repeated over several iterations using different beam pairs in order to determine a desired or optimal beam pair, which in turn may provide channel state information that the surface element group determination node can use to determine a surface element group for a given second node.

In some embodiments, the one or more communication parameters used to assign the second nodes to the node groups includes surface element group information that identifies the surface element groups of the second nodes. For such embodiments, upon the surface element group determination node determining the surface element groups for the second nodes, the node group assignment model may assign the second nodes to the node groups based on the surface element groups. In particular of these embodiments, the node group assignment node may determine how to assign the second nodes into the node groups based on at least one surface element overlap criterion associated with the surface element groups.

In general, two surface element groups overlap each other if they have at least one surface element 206 that is the same as, or in common with, each other. A surface element 206 is common to two or more surface element groups may be referred to as a common surface element or an overlapping surface element. A surface element state indicates or characterizes an overlap between or among two or more surface element groups. A "no overlap" surface element state for two or more surface element groups indicates that the two or more surface element groups do not have any surface elements in common. A "partial overlap" surface element state for two or more surface element groups indicates that the two or more surface element groups have at least one, but not all, of their surface elements in common. In various embodiments, a partial overlap surface element state may also include, or be accompanied with, an amount of overlap between the surface element groups, which may be a total number of surface elements in common, or a percentage of a total number of surface elements of one or both of the surface elements groups. A "full overlap" surface element state for two or more surface element groups indicates that the two or more surface element groups have all of their surface elements in common.

One surface element overlap criterion may be an overlap threshold corresponding to a threshold number of surface elements in common. In various embodiments, for two or more surface element groups, the overlap threshold may be an absolute number of surface elements in common, or a percentage of a total number of surface elements of the two or more surface element groups, that are in common. For two surface element groups of two given second nodes, the node group assignment node may determine an amount of surface element overlap for the two surface element groups. If the amount of surface element overlap is less than, or does not exceed, the overlap threshold, then the node group assignment node may assign the two given second nodes to the same node group. In addition, if the amount of surface element overlap exceeds the overlap threshold, then the node group assignment node may assign the two given second nodes to different node groups.

In various embodiments, the overlap criterion corresponds to a target surface element overlap state, which in turn may correspond to the overlap threshold. For example, for embodiments where the target surface element state is "no overlap," then the overlap threshold may be zero or zero percent. As another example, for embodiments where the target surface element state is "partial overlap," then the overlap threshold may be a number of surface elements or a percentage of surface elements greater than zero.

Another surface element overlap criterion may be a surface element group boundary criterion. In general, boundary surface element of a given surface element group is a surface element that forms a boundary (or an edge or an outer perimeter) of the given surface element group. Accordingly, a surface element group boundary criterion may be that two second nodes may be assigned to the same node group if the only common surface elements of their surface element groups are boundary surface elements. On the other hand, two second nodes may be assigned to different node groups if at least one of the common surface elements is not a boundary surface element of at least one of the two surface element groups. Another surface element group boundary criterion may be a number of common surface elements that are boundary surface elements, which, in various embodiments, may be an absolute number of surface elements or a percentage of a total number of surface elements of the two surface element groups. If the number of common surface elements that are boundary surface elements is less than, or does not exceed, a threshold, then the node group assignment node may assign the two second nodes to the same node group. In addition, of the number of common surface elements that are boundary surface elements is exceeds the threshold, then the node group assignment node may assign the two second nodes to different node groups.

In addition or alternatively, the communication parameters on which the node groups for the second nodes are assigned may include channel state information. In various embodiments, the channel state information may include angle information (or angle domain information), and/or gain information (including channel gain information and/or path gain information) associated with channels between the intelligent reflecting device 124 and the second nodes. For such embodiments, the node group assignment node may determine the node groups based on at least one of the angle information or the gain information. In particular of such embodiments, the node group assignment node determines the node groups based on angle spreads of the second nodes and/or central angles of the second nodes. For at least some of these embodiments, the node group assignment node determines the node groups based on an at least one angle overlap criterion associated with the angle spread and/or the central angle.

In further detail, angle information associated with a given second node may include or indicate one or more angles of incidence or arrival. The one or more angles may include or be characterized as an angle spread or an angular region. For a given transmission of a signal, where the receiving node (the given second node or the intelligent reflecting device 124 depending on which node is transmitting and which node is receiving), receives a single version of the transmitted signal over a single path, the angle spread includes single angle of arrival for the single signal. In addition, where the receiving node receives multiple versions of the transmitted signal over multiple paths (i.e., the transmission is a multipath transmission), the receiving node may receive the multiple versions of the signal at multiple angles of arrival, in which case the angle spread includes multiple angles. In addition to having an associated angle of arrival, each signal version received over an associated path may have an associated signal energy and/or the associated path may have an associated path gain. Also, for a given second node, the angle information and/or the angle spread includes a central (or center) angle, which is the angle, among the multiple angles making up the angle spread associated with the highest signal energy and/or path gain.

In various embodiments, the node group assignment node may determine the node groups based on the angle spreads and/or the central angles of the second nodes. In particular embodiments, the node group assignment node may determine the node groups based on the angle spreads and/or the central angles and one or more angle overlap criteria. In some embodiment, the angle overlap criteria may be based on an amount of overlap, such as a percent overlap, between two angle spreads of two nodes. If the amount of overlap between two angle spreads of two given second nodes is at or below an angle spread overlap threshold, then the node group assignment node may assign the given second nodes to the same node group. Alternatively, if the amount of overlap between the two angle spreads is above an angle spread overlap threshold, then the node group assignment node may assign the given two second nodes to different node groups. In other embodiments, the angle overlap criteria may be based on an overlap between central angles of two nodes. If the central angles of a given two nodes are different, or have a difference that is above a difference threshold, then the node group assignment node may assign the given two nodes to the same node group. Alternatively, if the central angles of the given two nodes match, or have a difference that is at or below a difference threshold, then the node group assignment node may assign the given two nodes to different node groups.

Additionally, in various embodiments, including those involving relatively high frequencies, the node group assignment node may ignore angle spread, and only use the central angles to determine how to group the second nodes into node groups.

Additionally, for at least some embodiments, the center angles and the angle spreads that the node group assignment node determines or uses to determine node groups are effective center angles and angle spreads that are determined based on a power or energy threshold. In particular, if a given received signal, received over an associated path, has a signal power or energy above a power or energy threshold, and/or the associated path has an associated path gain above a path gain threshold, then the node group assignment node may add the associated arrival angle to the effective angle spread of the given second node. Alternatively, if the signal power or energy is below the power or energy threshold, and/or the associated path gain is below the path gain threshold, then the node group assignment node may not add the associated arrival angle to the effective angle spread of the given second node.

Also, in various embodiments, the node group assignment node may determine the node groups based on the angle and gain information for channels between the intelligent reflecting device 124 and the second nodes where the channels are sparse. In addition or alternatively, the node group assignment node may determine the angle and/or gain information based on reciprocity. Where the node group assignment node operates under full reciprocity, and if the node group assignment node determines ideal channel state information for the channels between the intelligent reflecting device 124 and the second nodes, then the node group assignment node may identify the angle and gain information for transmission from the first node to the second nodes to be the same as that for transmission from the second nodes to the first node. Additionally, where the node group assignment node operates under full reciprocity and the determined channel state information is not ideal, then the node group assignment node may identify the angle and gain information for transmission from the first node to the second nodes to be the same as that for transmission from the second nodes to the first node plus some correction (for example, where the channel state information is not ideal, pilot signals may communicate to correct channel state information obtained by channel reciprocity). Additionally, where the node group assignment node operates under partial reciprocity, the first node may transmit signals, such as pilot signals, to the second nodes, or the second nodes may transmit signals to the first node, via the intelligent reflecting device 124, order to obtain one or more channel state parameters that cannot otherwise be obtained due to reciprocity being only partial and not full. Additionally, where the node group assignment node operates under non-reciprocity, the first node may transmit signals, such as pilot signals, to the second nodes, or the second nodes transmit signals to the first node, via the intelligent reflecting device 124, to determine or recover the angle and gain information. Under partial or non-reciprocity, for embodiments where the second nodes transmit signals to the first node, the first node, in response, can directly determine the angle and gain information. Additionally, for embodiments where the first node transmits signals to the second node, the second nodes can feed back angle and gain information to the first node, and in response the first node can determine the angle and gain information based on the feedback information from the second nodes. Also, in various embodiments, in conjunction with signal transmission (e.g., pilot signal transmission), the node group assignment node may employ any of various channel state information approaches or algorithms to determine the angle and gain information, such as least squares (LS), minimum mean square error (MMSE), multiple signal classification (MUSIC), or estimation of signal parameters via rotational invariance (ESPRIT).

In addition or alternatively, in various embodiments, a communication parameter may include an orthogonality between channels for two second nodes. That is, in various embodiments, the node group assignment node may determine the node groups based on orthogonalities between channels between the intelligent reflecting device 124 and the second nodes. In particular embodiments, the node group assignment node use orthogonality information to determine the node groups where the channels between the intelligent reflecting device 124 and the second nodes are not sparse. Upon determining an orthogonality between two channels for a given two second nodes, the node group assignment node may compare the determined orthogonality with a predetermined orthogonality threshold. If the determined orthogonality is above the predetermined orthogonality threshold, then the node group assignment node may determine to assign the given two second nodes to the same node group. Alternatively, if the determined orthogonality is below the predetermined orthogonality threshold, then the node group assignment node may determine to assign the given two nodes to separate node groups.

Additionally, in various embodiments, the node group assignment node may determine the orthogonalities based on complete channel information. For embodiments where the node group assignment node operates under full reciprocity, the node group assignment node may determine channel state information for channels in the direction from the first node to the second nodes directly from channel state information for channels in the direction from the second nodes to the first node. For example, if the first node is a wireless access node 104 and the second nodes are user devices 102, the node group assignment node may determine channel state information for downlink channels from the wireless access node 104 to the user devices 102 directly from channel state information for uplink channels from the user devices 102 to the wireless access node 104. Additionally, where the node group operation node operates under non-reciprocity, the first node may transmit one or more signals (e.g., pilot signals) to the second nodes, or the second nodes may transmit one or more signals (e.g., pilot signals) to the first node to determine the complete channel state information. Under partial or non-reciprocity, for embodiments where the second nodes transmit signals to the first node, the first node, in response, can directly determine the complete channel state information. Additionally, for embodiments where the first node transmits signals to the second node, the second nodes can feed back channel state information to the first node, and in response the first node can determine the channel state information based on the feedback information from the second nodes. Also, in various embodiments, in conjunction with signal transmission (e.g., pilot signal transmission), the node group assignment node may employ any of various channel state information approaches or algorithms to determine the angle and gain information, such as least squares (LS) or minimum mean square error (MMSE), as non-limiting examples.

In addition or alternatively, in various embodiments, a communication parameter includes location information the second nodes. That is, in various embodiments, the node group assignment node may determine the node groups based on location information of the second nodes. Location information may include a relative position of a second node within a two-dimensional or a three-dimensional space relative to the intelligent reflecting device 124, and/or a relative distance of a second node from the intelligent reflecting device. For a given two second nodes, the node group assignment node may determine how to group the two second nodes based on a location difference between the two second nodes, which the node group assignment node may determine from the location information of the two second nodes. If the location difference between the two nodes exceeds a location difference threshold, then the node group assignment node may determine to group the two nodes in the same node group. Alternatively, if the location difference between the two nodes does not exceed a location difference threshold, then the node group assignment node may determine to group the two nodes in different node groups. Any of various location parameters may be used to determine a location difference and location difference threshold between two second nodes, including an absolute distance difference, or a distance difference in one direction vector within a two-dimensional or three-dimensional space, such as a horizontal distance difference or a vertical (or height) distance difference.

In addition or alternatively, in various embodiments, a communication parameter includes a device type of the second node. For such embodiments, the node group assignment node may determine to group or assign second nodes of the same device type in a same node group, and assign second nodes of different device types in different node groups. The node group assignment node may group second nodes in node groups based on device type under the presumption that devices of the same type require the same services and/or communicate under similar communication parameters, such as transmission rate or delay. Example device types may include user device types, non-limiting examples of which include enhanced Mobile Broadband (eMBB) and Ultra Reliable Low Latency Communications (URLLC). Grouping according to device type may be especially advantageous in mMTC scenarios involving a massive amount of user devices communicating with a base station at one time.

In addition or alternatively, in various embodiments, a communication parameter includes one or more quality of service (QoS) parameters, non-limiting examples of which include a minimum SINR, a minimum data rate, a minimum capacity, a minimum number of surface elements that a surface element group can have, a secure communication rate, or a minimum inter-user interference. In various embodiments, the node group assignment node may determine a QoS objective based on one or more QoS parameters for each second node. In turn, for a given two second nodes, if the node group assignment node determines that the QoS objectives for the two second nodes match or are sufficiently close to each other (e.g., such as by their difference being below a QoS objective threshold), then the node group assignment node may determine to assign the two second nodes to the same node group. Additionally, if the node group assignment node determines that the QoS objectives for the two second nodes are sufficiently far apart from each other (e.g., their difference is above a QoS objective threshold), then the node group assignment node may determine to assign the two second nodes to different node groups.

Also, in various embodiments, the node group assignment node may assign second nodes to user groups based on a node distribution criteria. Specifically, the node group assignment node may assign second nodes to node group in order to achieve as even of a distribution of second nodes in the node groups as possible. Accordingly, after assigning the second nodes to the node groups according to one or more of the above-identified criteria, the node group assignment node may analyze the groups to determine if the numbers of second nodes in the node groups is evenly distributed as best as possible. If not, then the node group assignment node may change the assignment of at least one second node from an original or current node group to a different node group in order to achieve a more even distribution of numbers of second nodes in the node groups. The node group assignment node may perform several iteration of moving one or more second nodes into one or more different node groups until an optimally even distribution of numbers of second nodes in the node groups is achieved.

Additionally, in various embodiments, after the node group assignment node determines the node groups for the second nodes, a node group notification node, which may be the node group assignment node or another node, may notify the second nodes of the node groups to which they belong. In various embodiments, the node group notification node may notify the second nodes by broadcasting the node group information to the second nodes. In particular embodiments, the node group notification node may include the node group information at the header of the broadcast signals. In response to receipt of a broadcast signal, a second node checks the header of the broadcast signal to identify the node group to which it belongs. In various embodiments, the node groups may each have an associated node group identifier (ID) that uniquely identifies the node group. For at least some of these embodiments, the node group notification node may use the node group IDs to notify the second nodes of the node groups.

Additionally, in various embodiments, the node group notification node may notify the second nodes before the first node transmits signals to the second node. For example, the node group notification node may broadcast the node group information to the first node in advance of other signals that the first node is to transmit to the second nodes via the intelligent reflecting device 124. For other embodiments, the first node includes the group node information in signals that it transmits to the second nodes. After the signals are reflected by the intelligent reflecting device 124, the second nodes receive the reflected signals. A given second node receiving a reflected signal may check a portion of the reflected signal, such as a header of the reflected signal, to identify the node group to which it belongs.

Also, in various embodiments where the node group assignment node is not the intelligent reflecting device 124, the node group assignment node may also notify the intelligent reflecting device 124 of the node group information. The node group assignment node may notify the intelligent reflecting device either wirelessly or through a wired connection, depending on how it is communicatively connected to the intelligent reflecting device 124.

At block 304, after the node group assignment node assigns each of the second nodes to one of the plurality of node groups, the first node may determine a plurality of signals to transmit to the plurality of second nodes via the intelligent reflecting device 124. In order for the first node to transmit the signals, a scheduling node may determine a timing schedule according to which to transmit the signals. The scheduling node may be the first node, or another node. The timing schedule may identify times at which to transmit each of the signals. In particular, the timing schedule may identify one or more time slots, and associate each time slot of the one or more time slots with one of the signals that the first node is to transmit. A given time slot associated with a given signal in the timing schedule indicates that the first node is to transmit the given signal in or during the given time slot. The scheduling node may generate the timing schedule based on the node groups determined at block 302. In particular, the scheduling node may associate signals with time slots such that the timing schedule indicates to transmit signals for receipt by second nodes of a same node group in the same time slot, and to transmit signals for receipt by second nodes of different node groups in different time slots.

To illustrate, suppose a second node A and a second node B are in the same node group, and suppose the first node is to transmit a first signal to second node A and a second signal to second node B. Because second node A and second node B are in the same node group, the scheduling node may generate the timing schedule to indicate to transmit the first and second signals in the same time slot. As another illustration, suppose a second node A and a second node C are in different node groups, and suppose the first node is to transmit a third signal to second node C. Because second node A and second node C are in different node groups, the scheduling node may generate the timing schedule to indicate to transmit the first signal and the third signal in different time slots.

At block 306, the first node may transmit the signals to the second nodes via the intelligent reflecting device 126 according to the timing schedule. In doing so, the first node transmits the signals in the time slots with which each of the signals are associated. Additionally, the signals are transmitted to the second nodes via the intelligent reflecting device 124, in that after a given signal to be received by a given second node is transmitted by the first node, the given signal is reflected by the intelligent reflecting device 124 before the given signal is received by the given second node.

Figure 4:
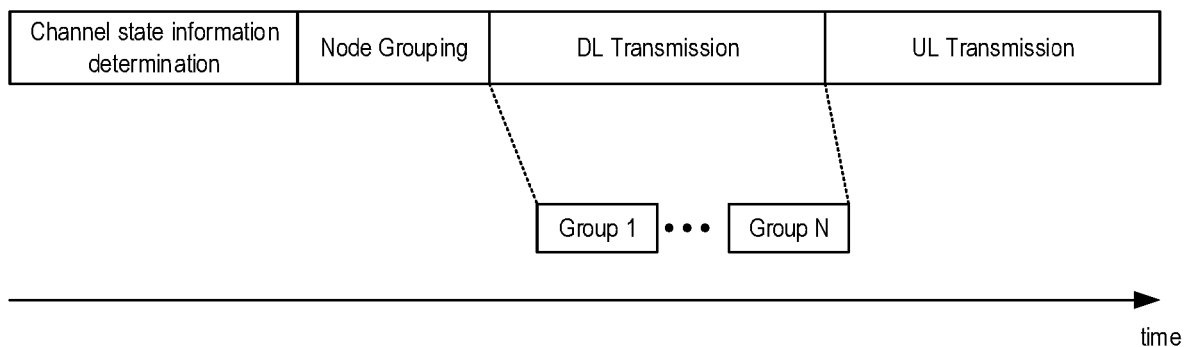
FIG. 4 is a timing diagram of a transmission scheme involving an intelligent reflecting device with downlink transmission performed on a node group-by-node group basis.

FIG. 4 shows an example timing diagram illustrating an example timing scheme for performing downlink and uplink data transmissions based on node grouping. Such a timing diagram may be implemented where the first node is a wireless access node 104, and the second nodes are user devices 102. Similar timing schemes may be implemented for other configurations where the first and second nodes are other than a wireless access node 104 and user devices 102, respectively. As shown in FIG. 4, the nodes may determine channel state information, which may include uplink channel estimation followed by downlink channel estimation. After determining the channel state information, the node group assignment node may determine node groups for the second nodes (user devices 102), based on one or more communication parameters as previously described. After determining the node groups, the wireless access node 104 may transmit downlink signals to the user devices 102 via the intelligent reflecting device 124 over a plurality of time slots on a node group-by-node group basis, such as according to a timing schedule based on the node groups, as previously described. After transmitting downlink signals to a last node group of user devices 102, the user devices 102 may transmit uplink signals to the wireless access node 104.

In addition or alternatively to node grouping performed by a node group assignment node, a region determination node (which may be the same as or different from the node group assignment node, and/or may be the first node or another node in the wireless communication system 100) may determine a plurality of surface element regions 208 for a plurality of surface elements 206 of an intelligent reflecting device 200. The region determination node may determine the plurality of surface element regions 208 by dividing, grouping, or separating the surface elements 206 into the surface element regions 208.

Upon determining the plurality of surface element regions 208, the first node may independently set communication parameters for respective communications between the first node and the plurality of surface element regions 208. An example communication parameter is a beam, such as a transmit beam that the first node selects and with which the first node uses to transmit a signal. To illustrate, if the first node is to transmit a first signal to a first surface element region and a second signal to a second surface element region, the first node may independently select a first beam to use to transmit the first signal to the first surface element region and a second beam to use to transmit the second signal to the second surface element region. The first and second beams may be the same as or different from each other. Another example communication parameter is a reflection angle with which a surface element region reflects an incident signal, or at which a surface element region outputs a reflected signal. To illustrate, the first node may independently control a first surface element region to output a first reflected signal at a first reflection angle and a second surface element region to output a second reflected signal at a second reflection angle.

Figure 5:
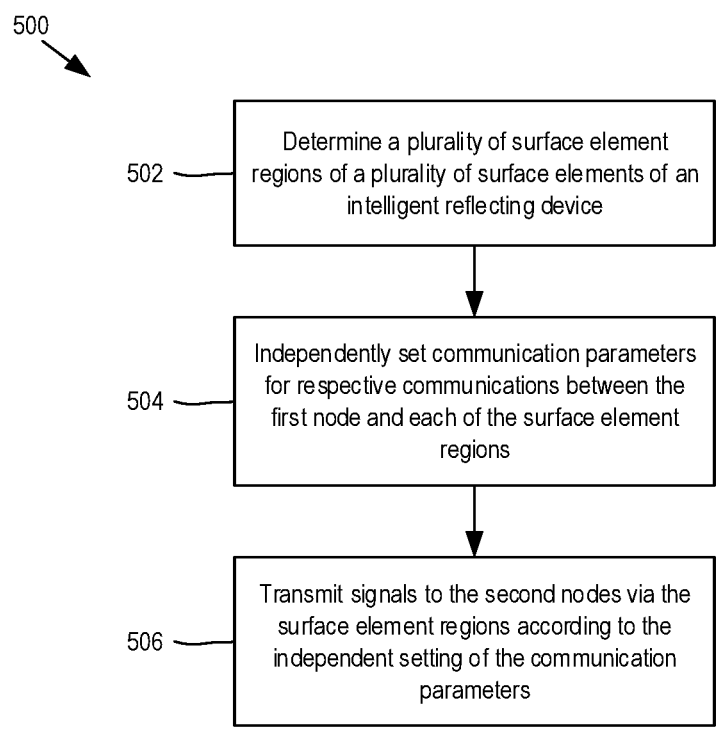
FIG. 5 is a flow chart of an example wireless communication method that includes surface element region determination.

FIG. 5 shows an example method 500 for wireless communication that includes surface element region determination. At block 502, a region determination node may determine a plurality of surface element regions 208 of a plurality of surface elements 206 of the surface 202 of an intelligent reflecting device 200. The region determination node may form the plurality of surface element regions 208 by dividing the plurality of surface elements 206 into a plurality of surface regions 208. To divide the surface elements 206 into surface element regions 208, the region determination node may assign or associate each surface element 206 to one of the plurality of surface regions 208. Accordingly, upon dividing the surface elements 206 into the surface element regions 208, which surface element region 208 to which each surface element 206 belongs may be known. The region determination node may divide the surface elements 206 in any of various ways based on any of various criteria, examples of which are described in further detail below.

For some embodiments, the region determination node may determine a number of the surface element regions 208 into which to divide the surface elements 206. For example, the region determination node may determine a number of the surface element regions 206, and then a region assignment node may assign each of the surface elements 206 to one or more of the number of surface element regions 208. For at least some of these embodiments, the region determination node may determine the number of surface element regions based on a number of second nodes. The number may further be based on a predetermined ratio of a number of surface element regions 208 to a number of second nodes. In various embodiments, the ratio is less than one, equal to one, or greater than one, meaning that the number of surface regions 208 may be less than the number of second nodes, equal to the number of second nodes, or greater than the number of second nodes, according to the ratio.

In addition or alternatively, the number of surface regions 208 may be directly proportional to the number of second nodes. Accordingly, as the number of second nodes increases, so does the number of surface regions 208, and as the number of second nodes decreases, so does the number of surface regions 208.

In addition, in at least some embodiments, the region determination node may determine shapes for the surface element regions 208. The region determination node may certain assign surface elements 206 as boundary surface elements for the surface element regions 208 in order to form the shapes. Any of various shapes that can be formed with one or more surface elements 206 of the surface 202 may be possible, such as rectangular or polygonal, star-shaped, elliptical, amorphous, or any other type of shape.

In addition, for at least some embodiments, upon determination of the surface element regions 208, a region assignment node, which may be the same node as, or a different node than, the region determination node, may assign or match each of the second nodes to one or more of the surface element regions 208. Through the assignment or matching, the region assignment node establishes an association between the surface element regions 208 and the second nodes. In turn, when the first node is to transmit a signal to a given second node associated with a given one or more surface element regions 208, the first node may transmit the signal to the one or more associated surface element regions 208, which will in turn reflect the signal toward the given second node. Prior to the reflection, the first node (or another node) may set one or more reflection angles of the one or more surface element regions 208 to optimum values for reflection of the signal to the given second node.

In various embodiments, the region assignment node may assign the second nodes to surface element regions 208 based on any of various communication parameters. For some embodiments, the region assignment node may assign the second nodes to the surface element regions 208 based on channel state information of channels between the surface elements 206 of the intelligent reflecting device 124 and the second nodes. From the channel state information, the region assignment node may determine received signal power or energy for each surface element 206 for each of the second nodes. In turn, the region assignment node may assign second nodes to one or more of the surface element regions 208 based on the received signal power or energy derived the channel state information, such as received signal amplitude of the channel state information. For example, the region assignment node may assign a given second node to a given surface element region 208 where the received signal power or energy of the surface elements 206 in the given surface element region 208 exceeds a threshold or is a highest, or among a predetermined number of highest, received signal powers or energies, for the given second node. If a channel between a second node and the surface elements 206 is sparse, the region assignment node may determine received signal power or energy for each of the surface elements 206 for each of the second nodes based on angle and gain information.

In addition or alternatively, for some embodiments, the region assignment node may assign the second nodes to the surface element regions 208 based on the surface element groups of the second nodes. For a given surface element group of a given second node and a given surface element region 208, if a number of surface elements 206 of the given surface element group that are also part of the given surface element region 208 meets or exceeds a threshold, then the region assignment node may assign the given second node to the given surface element region. In various embodiments, the threshold may be a threshold number of surface elements, or a percentage of a total number of surface elements of the given surface element group. For example, if the threshold is five surface elements, then the region assignment node may assign a given second node to a given surface element region 208 if a surface element group associated with the given second node has at least five surface elements that are in or part of the given surface element region. As another example, if the threshold is 50%, then the region assignment node may assign a given second node to a given surface element region if a surface element group associated with the given second node has at least 50% of its surface elements in or part of the given surface element region.

Also, in some embodiments or situations, a surface element group of a given second node may overlap two or more surface element regions—i.e., the surface element group may include surface elements that are part of two or more surface element regions. For at least some of these embodiments, the region assignment node may have a predetermined maximum number of surface element regions to which to assign a given second node. If the number of surface element regions overlapped by the surface element group exceeds the predetermined maximum number, then the region assignment node may select the predetermined maximum number surface element regions, from among the surface element regions that the surface element group is overlapping, that have the strongest signal power for, or as it relates to, the given second node, and assign the selected surface element region(s) to the given second node.

In addition or alternatively, for some embodiments, the region assignment node may assign the second nodes to one or more of the surface element regions 208 based on target communication parameters, such as target SINR, capacity, or data rate as non-limiting examples. For at least some of these embodiments, the region assignment node may determine a number of surface element regions 208 to assign to a given second node based on one or more target communication parameters. For example, the region assignment node may assign only one or more than one, such as two or more, surface element regions to a given second node based on one or more target communication parameters. In addition or alternatively, the region assignment node may assign more surface element regions 208 to a first second node than to a second second node where the first second node has one or more higher target communication parameters than the second second node. To illustrate, if a first second node has a higher target communication parameter than a second second node, the region assignment node may assign the first second node to two surface element regions 208 and the second second node to only one surface element region 208.

In addition or alternatively, for some embodiments, the region assignment node may assign the second nodes to one or more of the surface element regions 208 based on location information associated with the second nodes. For at least some of these embodiments, the region assignment node may assign more surface element regions 208 to a first second node than to a second second node where the first second node is farther away from the intelligent reflecting device 124 than the second second node. In addition or alternatively, the region assignment node may assign second nodes to surface element regions 208 based on relative distances away from the surface element regions 208. In particular, the region assignment node may assign closer second nodes to the surface element regions over second nodes that are further away. For example, if a first second node is closer to a first surface element region than a second second node, and the second second node is closer to a second surface element region than the first second node, then the region assignment node may assign the first second node to the first surface element region and the second second node to the second surface element region.

The above-described surface element region determinations may be considered fixed surface element region determinations in that the surface element regions 208 that are determined may be fixed in number, size and shape before the second nodes are assigned to the surface element regions. In other embodiments, the region determination node may perform dynamic surface element region determinations. Under a dynamic surface element region determination, the region determination node determines the surface element regions 208 "on the fly" or dynamically as a function of, or dependent on, the surface element groups of the second nodes. For example, even if the number of second nodes is known, the region determination node may not determine the size, shapes, relative positions of the surface element regions 208, or generally which surface elements 206 belong to which surface element regions 208, until or unless the surface element groups of the second nodes are known. In contrast, under the previously described fixed approaches, the surface element regions 208 are determined (i.e., which surface elements 206 are in which surface element region 208), and then the second nodes are assigned or matched to one or more of the surface element regions 208 based on one or more criteria, one of which may be the surface element groups of the second nodes, as previously described.

Under a dynamic surface element determination scheme, the region determination node may identify a surface element region 208 as a region that includes a surface element group of a given second user. The surface element region 208 may be a surface element group itself, or may be a surface element group in addition to other surface elements 206 surrounding the surface element group. In particular embodiments, a surface element region 208 includes all of the surface elements 206 of a surface element group, although in other embodiments, a surface element region 208 that includes less than all of the surface elements 206 of a surface element group may be possible. In addition, in particular embodiments, the region determination node may determine surface element regions 208 according to a one-to-one correspondence or ratio of surface element regions 208 to surface element groups (or to second nodes). That is, for such embodiments, a surface element region 208 includes the surface elements 206 of only one surface element group, and/or the region assignment node assigns or matches only one second node is to a surface element region 208. In other embodiments, the region determination node may determine a surface element region 208 that includes more than one surface element group, and/or the region assignment node may assign or match more than one second node to a surface element region 208. In either case, when the region determination node determines one or more surface element groups to be a part of a surface element region 208, the region determination node may determine a boundary of the surface element region 208 that includes the one or more surface element groups, while excluding surface elements of other surface elements groups. In this way, the region determination node determines the surface element regions 208, including their size, shape, and relative positioning on the surface 202 dynamically as a function of the surface element groups (e.g., as the region determination node analyzes the surface element groups), rather than in a predetermined or fixed manner.

For at least some embodiments, in the event that two surface element groups of a given two second nodes overlap and the region determination node determines to form two different surface element regions 208 for the two surface element groups, the region determination node may determine which of the two surface element regions 208 to which to assign the overlapping surface elements 206 based on one or more overlap criterion. One overlap criterion may be based on received signal strength. Specifically, the region determination node may determine to assign or match an overlapping surface element to the surface element region 208 of the second node that has the larger received signal power. Another overlap criterion may be based on surface element numbers. Specifically, the region determination node may determine to assign or match an overlapping surface element to the surface element region 208 that has the fewer number of surface elements. In other embodiments, the region determination node may not choose one surface element region 208 over another. Instead, the region determination node may assign an overlapping surface element 206 to both of the two surface element regions 208. In other embodiments, the region determination node may determine to assign an overlapping surface element region 206 to neither of the two surface element regions 208, and instead leave the surface element 206 as a vacant surface element 206 that is available to be part of another surface element region 208.

In addition, for at least some embodiments implementing a dynamic region determination scheme, the region determination node may determine sizes (numbers of surface elements 206) of the surface element regions 208 based on location information of the second nodes. For example, the region determination node may determine a size of a surface element region 208 for a given second node as a function or, or dependent on, a distance of the given second node from the intelligent reflecting device 124. In particular embodiments, the region determination node may allocate more surface elements 206 to surface element regions 208 for second nodes that are farther away from the intelligent reflecting device 124 than other compared to other second nodes that are closer to the intelligent reflecting device 124.

In addition or alternatively, for at least some embodiments implementing a dynamic region determination scheme, the region determination node may determine sizes of the surface element regions 208 based on one or more target communication parameters (e.g., target SINR, target capacity, target data rate). In particular embodiments, the region determination node may allocate more surface elements 206 to surface element regions 208 for second nodes with one or more higher target communication parameters compared to other second nodes with lower target communication parameters.

In addition or alternatively, for at least some embodiments implementing a dynamic region determination scheme, the region determination node may determine the surface element regions based on the node groups. For example, the node group assignment node may assign each of the second nodes to one of a plurality of node groups, as previously described. In addition, as previously described, a scheduling node may determine a timing schedule that indicates to transmit signals for receipt by second nodes of a same node group in a same time slot, and to transmit signals for receipt by second nodes of different node groups in different time slots. In accordance with node grouping the corresponding timing schedule, the region determination node may determine surface element regions on a node group-by-node group, or on a time slot-per-time slot basis. In particular, the region determination node may determine a set of surface element regions 208 for each node group. Because the first node transmits signals to different node groups in different time slots, then the region determination node may use the same surface elements 206 for the different sets surface element regions 208.

Figure 6A:
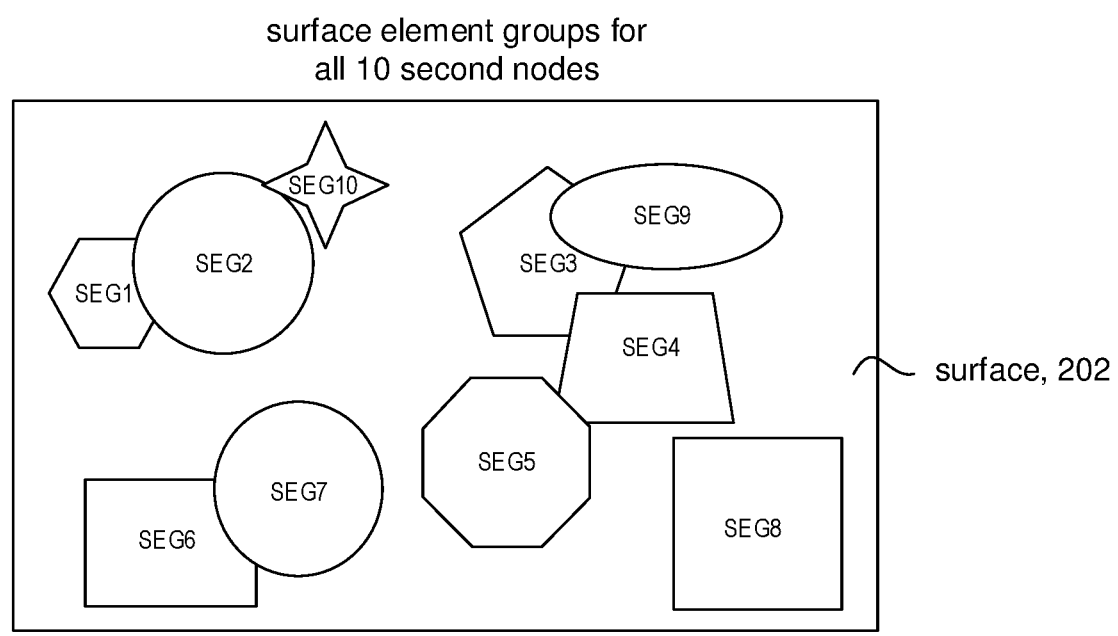
FIG. 6A shows a diagram of surface element groups distributed on surface of an intelligent reflecting device.
Figure 6B:
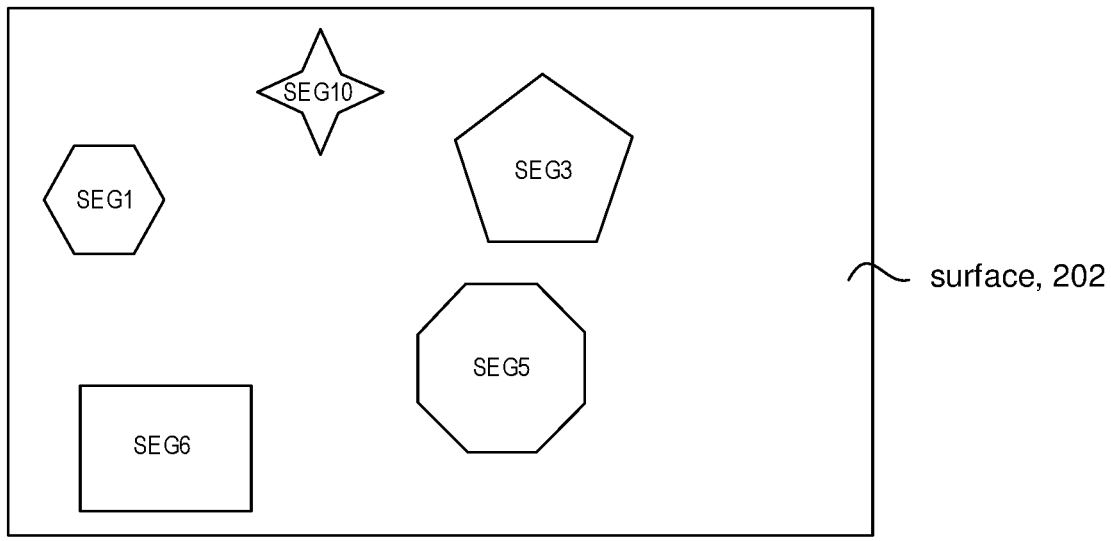
FIG. 6B shows the diagram of FIG. 6A, with the surface element groups separated based on node grouping.
Figure 6B:
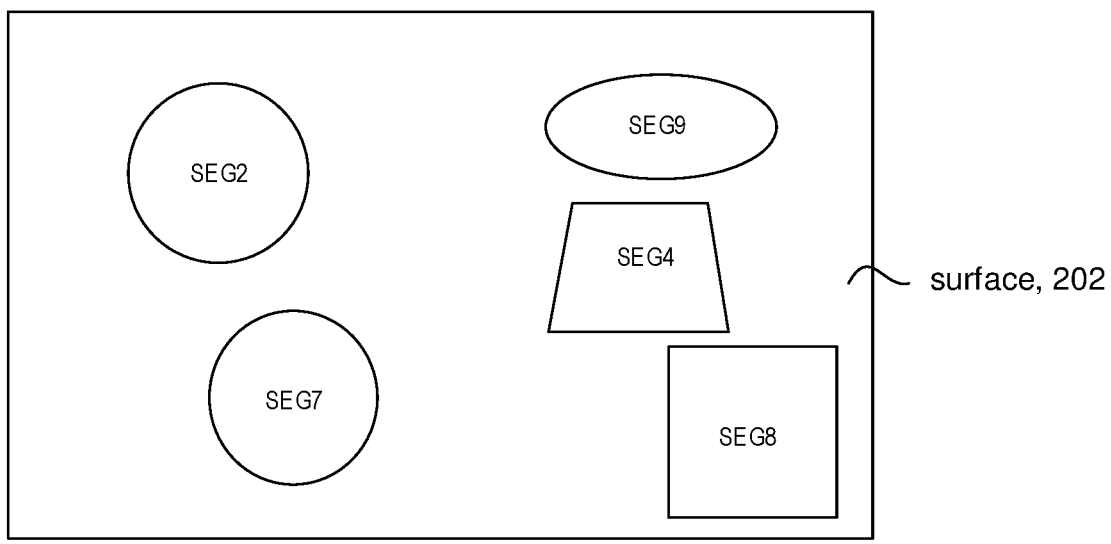
Figure 6C:
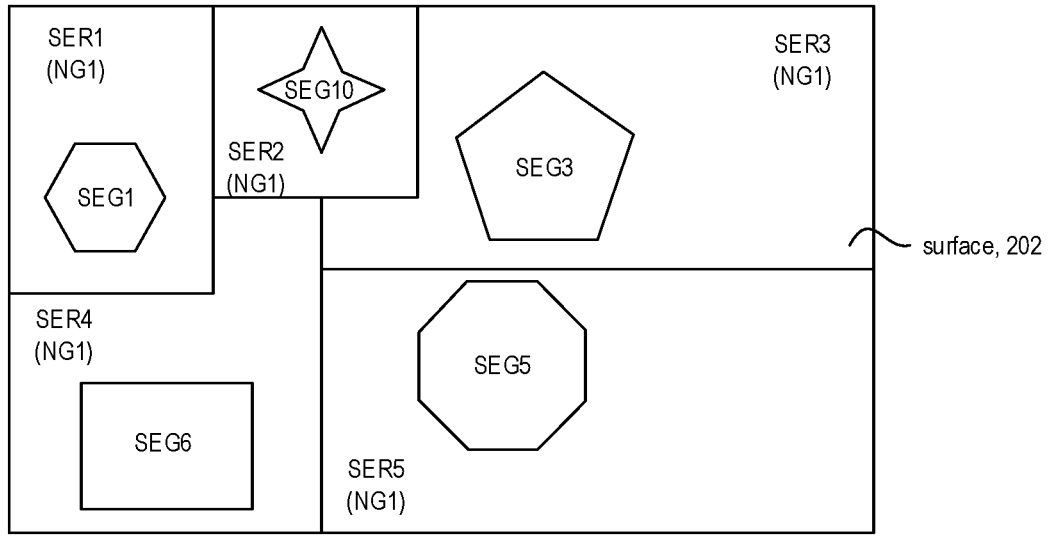
FIG. 6C shows the diagram of FIG. 6B, with the surface element groups included in surface element regions.
Figure 6C:
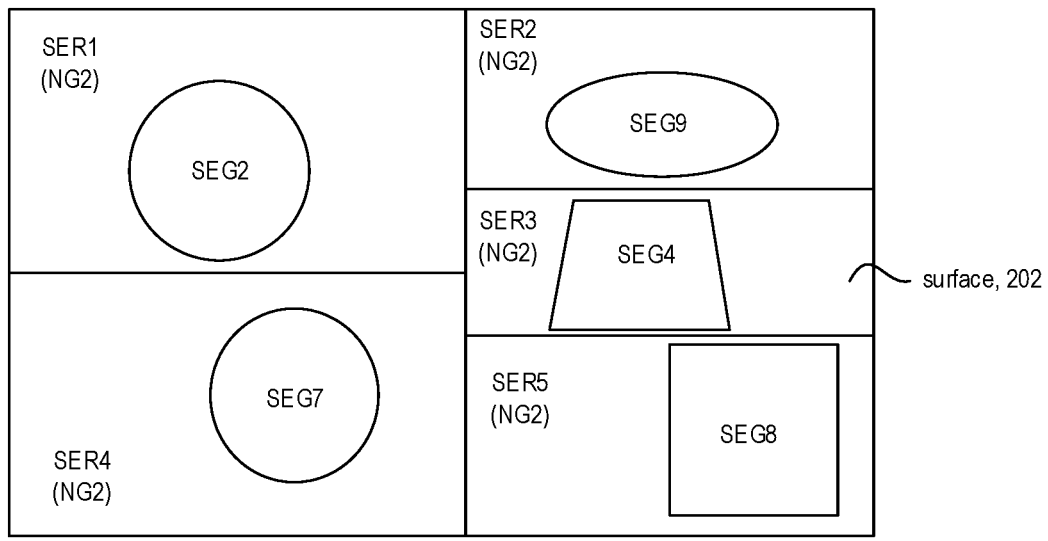

FIGS. 6A-6C illustrates an example of dynamic region determination based on node groups determined from surface element groups. In the example, the first node is to communicate with ten second nodes. FIG. 6A shows ten surface element group (SEG), distributed across a surface 202 of an intelligent reflecting device, with each surface element group being associated with one of the ten second nodes. For example, a first surface element group SEG1 is associated with a first second node, a second surface element group SEG2 is associated with a second second node, and so on. Referring to FIG. 6B, the node group determination node may group each of the ten second nodes into one of a plurality of node groups, such as based on one or more of the criteria previously described. In the example in FIG. 6B, the second nodes are grouped into two node groups, including a first node group (node group 1) and a second node group (node group 2). Specifically, the first, third, fifth, sixth, and tenth second nodes are grouped into node group 1, and the second, fourth seventh, eighth, and ninth second nodes are grouped into node group 2. Referring to FIG. 6C, the region determination node determines a plurality of sets of surface element regions, each set for one of the node groups. For example, since the node group determination node determines two node groups, then the region determination node determines two sets of surface element regions, each for one of the two node groups. As shown in FIG. 6C, each set includes five surface element regions (SER), one surface element region for each of the five second nodes in that node group. For the first node group, a first surface element region (SER1) includes the surface element group of the first second node (SEG1); the second surface element region (SER2) include the surface element group of the tenth second node (SEG10); and so on. Similarly, for the second node group, the first surface element region (SER1) includes the surface element group of the second second node (SEG2); the second surface element region (SER2) includes the surface element group of the ninth second node (SEG9); and so on.

Upon determining the sets of surface element regions, the first node and/or the intelligent reflecting device 124 may independently set one or more communication parameters for communication with the different surface element regions within the same set of surface element regions, and may also independently set one or more communication parameters for communication with different surface element regions in different sets of surface element regions. For example, with respect to FIG. 6C, the first node may determine to transmit a first set of signals to the first node group via the intelligent reflecting device 124 in a first time slot. To do so, the first node may independently select transmit beams to transmit signals to each of the five surface element regions of the first set of surface element regions, and/or the intelligent reflecting device 124 may independently set reflection angles for each of the five surface element regions of the first set of surface element regions. With the transmit beams and/or reflection angles independently set, the first node may transmit the first set of signals to the second nodes in the first node group via the intelligent reflecting device in the first time slot. In addition, the first node may determine to transmit a second set of signals to the second node group via the intelligent reflecting device 124 in a second time slot. To do so, the first node may independently select transmit beams to transmit signals to each of the five surface element regions of the second set of surface element regions, and/or the intelligent reflecting device 124 may independently set reflection angles for each of the five surface element regions of the second set of surface element regions. With the transmit beams and/or reflection angles independently set, the first node may transmit the second set of signals to the second nodes in the second node group via the intelligent reflecting device in the second time slot.

Under a dynamic region determination scheme, the region determination node determines or forms surface element regions 208 for particular second nodes. Consequently, the assigning of second nodes to surface element regions 208 is inherently done when determining the surface element regions 208. As such, unlike fixed region determination schemes, a dynamic region schemes may not expressly have a region assignment node to assign second nodes to surface element regions 208.

Additionally, in various embodiments for either a fixed region determination scheme or a dynamic region determination scheme, the region determination node and/or the region assignment node may notify the intelligent reflecting device 124 of the determined surface regions 208 and, at least for some embodiments, which of the second nodes are assigned or matched to each of the determined surface regions 208. The region determination node and/or the region assignment node may notify the intelligent reflecting device 124 either wirelessly, or through a wired connection, depending on how the region determination node and/or the region assignment node is communicatively connected to the intelligent reflecting device 124.

When a second node is sufficiently far from the intelligent reflecting device 124, the surface element group of a second node will likely or usually be relatively small compared to the overall size of the surface 202. As a result, the second nodes, or at least most of the second nodes, may have non-overlapping surface element groups, in turn allowing communication between the first node and the second nodes via the intelligent reflecting device 124 without much transmission loss. A dynamic region determination may be feasible even for relatively large surface element groups.

Figure 7:
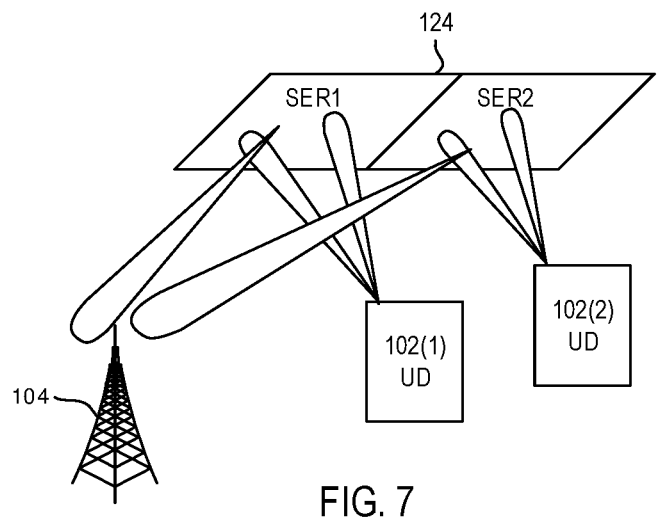
FIG. 7 shows a diagram of a wireless access node and user devices involved in an uplink communication via an intelligent reflecting device.

FIG. 7 shows a diagram of a wireless access node 104 and a plurality of user devices (UD) 102 communicating with each other via an intelligent reflecting device 124 during an uplink communication phase. In FIG. 6, two user devices 102(1) and 102(2) may transmit uplink signals at the same time. A first user device 102(1) may transmit an uplink signal to the wireless access node 104 via a first surface element region SER1 of the intelligent reflecting device, and a second user device 102(2) may transmit an uplink signal to the wireless access node 104 via a second surface element region SER2 of the intelligent reflecting device. The first surface element region SER1 may include a surface element group of the first user device 102(1), and the second surface element region SER2 may include a surface element group of the second user device 102(2). Spatial separation between the first and second surface element regions SER1, SER2 may be relatively unimportant in the uplink phase, or at least not as important as in the downlink phase, since the surface element regions SER of the intelligent reflecting device 124 form beams all pointing to a same entity, i.e., the wireless access node 104.

Referring back to the method of FIG. 5, after the region determination node determines the surface element regions, at block 504, the first node and/or the intelligent reflecting device 104 may independently set communication parameters for respective communications between the first node and the surface element regions. In various embodiments, the communication parameters include at least one of transmit beams of the first node or reflection angles associated with the surface element regions. For example, the intelligent reflecting device 124 may independently set reflection angles, such as through setting the phase shifts of the various surface elements 206, for the various surface element regions so that the surface element regions optimally reflect their respective incident signals toward the second nodes with which they are associated or matched. As another example, the first node may independently select transmit beams for transmitting signals to different surface element regions. For example, since different surface element regions are spatially separated, it may be desirable for the first node to use different transmit beams when transmitting to the different surface element regions. Accordingly, the first node may independently select optimal transmit beams in order to transmit signals to the respective different surface element regions. Other communication parameters that the first node and/or the intelligent reflection device 124 may independently set may be possible.

Figure 8A:
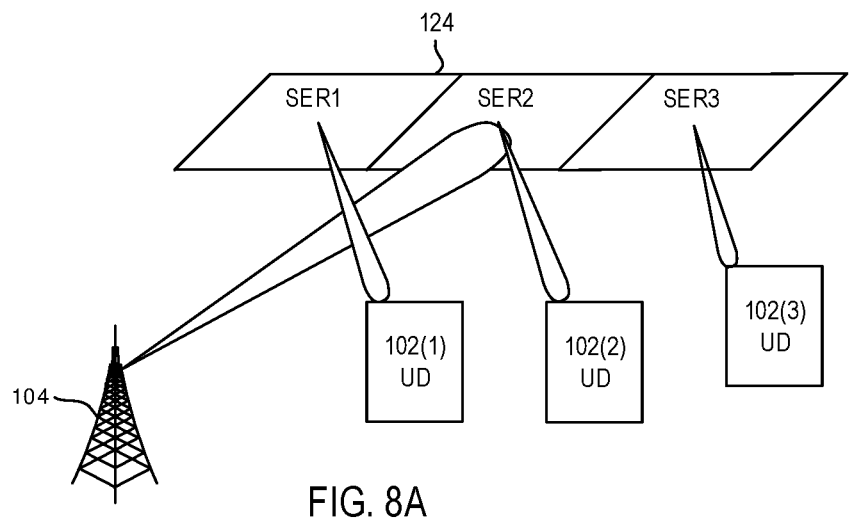
FIG. 8A shows a diagram of a wireless access node and user devices involved in a downlink communication via an intelligent reflecting device under near-field conditions.
Figure 8B:
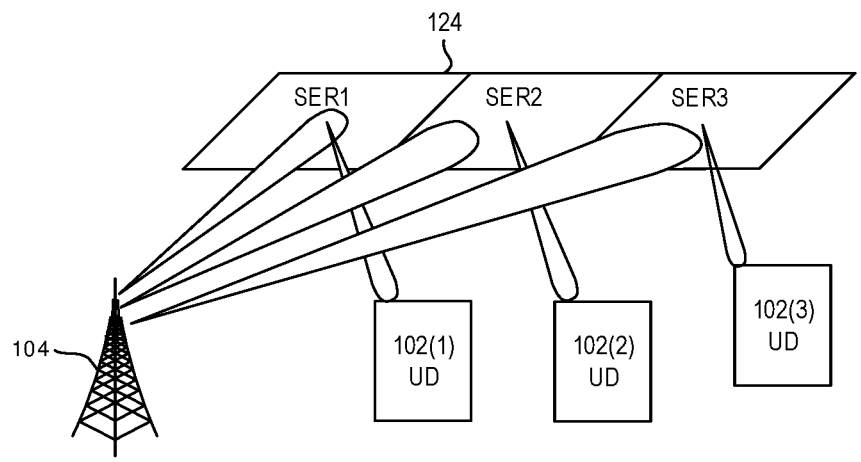
FIG. 8B shows a diagram of a wireless access node and user devices involved in a downlink communication via an intelligent reflecting device under far-field conditions

FIGS. 8A and 8B show diagrams of a first device transmitting to a plurality of second nodes via an intelligent reflecting device 124. In the particular situation shown in FIGS. 8A and 8B, the first node is a wireless access node 104, the plurality of second nodes are user devices 102, and the wireless access node 104 and user devices 102 are operating a downlink transmission phase, i.e., the wireless access node 104 is transmitting to the user devices 102. As shown in FIGS. 8A and 8B, the surface elements 206 of the intelligent reflecting device 124 are divided into three surface element regions SER1, SER2, SER3. Each of the three surface element regions SER1, SER2, SER3 is associated with, and is configured to reflect signals to, a respective one of three user devices 102(1), 102(2), 102(3).

FIG. 8A illustrates a situation where the distance between the wireless access node 104 and the intelligent reflecting device 124 is relatively small to satisfy near field conditions. For such near field conditions, all of the surface element regions SER may receive a similar signal, as illustrated in FIG. 8A.

FIG. 8B illustrates a situation where the distance between the wireless access node 104 and the intelligent reflecting device 124 is relative large to satisfy far field conditions. For such far field conditions, the first node (e.g., wireless access node 104) may independently formulate or use multiple or different beams simultaneously to transmit signals to the different surface element regions SER. Moreover, the intelligent reflecting device 124 may independently set reflection angles of the respective surface element regions to optimally reflect incident signals toward their respective second nodes (e.g., user devices 102) with which they are associated in order to minimize interference between the overall channels, including the paths from the first node (e.g., the wireless access node 104) to the surface element regions SER, and from the surface element regions SER to the second nodes (e.g., the user devices 102).

Referring back to FIG. 5, at block 506, after independent setting communication parameters for the respective communications, the first node may transmit the signals to the second nodes via the plurality of surface element regions of the intelligent reflecting device. As previously described, if the region determination node determines surface element regions 208 on a node group-by-node group basis, then the first node and/or the intelligent reflecting device may independently set the communication parameters for the different or multiple sets of surface elements regions, and transmit the signals to the different node groups after independently setting the communication parameters for their different sets.

Referring back to FIG. 1, as indicated, a wireless communication system 100 may include multiple intelligent reflecting devices 124. For such embodiments, in order for the first node to communicate with the second nodes via the multiple intelligent reflecting devices 124, an intelligent reflecting device selection node (which may be the first node may, an intelligent reflecting device, one or more second nodes, any other node in the communication system 100, or various combinations thereof) may first select or determine one or more target (or serving) intelligent reflecting devices, from among the plurality of intelligent reflecting device, for each of the second nodes. In various embodiments, the intelligent reflecting device selection node may independently select intelligent reflecting devices 124 for different second nodes, such that each second node is associated with a respective one or more target intelligent reflecting devices, and such that for any two given second nodes, the one or more target intelligent reflecting devices may be the same as or different from each other. For example, upon selecting target intelligent reflecting devices for the second nodes, the intelligent reflecting device selection node may determine for the first node to communicate with a first second node via a first set of one or more target intelligent reflecting devices, and determine for the first node to communicate with a second second node via a second set of one or more target intelligent reflecting device, where the first set of one or more target intelligent reflecting devices and the second set of one or more target intelligent reflecting devices are the same as, or different from, each other. Two sets of one or more target intelligent reflecting devices may be the same as each other if all of the target intelligent reflecting devices in their respective sets are the same. In addition, two sets of one or more target intelligent reflecting devices may be different from each other if at least one intelligent reflecting device in one set is not part of the other set of intelligent reflecting devices.

Additionally, for embodiments where a node group assignment node determines node groups for the second nodes, the node group assignment node may determine node groups for the second nodes based on the sets of intelligent reflecting devices, such as on an intelligent reflecting device-by-intelligent reflecting device basis. For example, suppose the first node is to communicate with a group of second nodes via multiple intelligent reflecting devices 124. Further, suppose that the intelligent reflecting device selection node determines that the first node is to communicate with only a subset of the group of second nodes via a first target intelligent reflecting device. In turn, the node group assignment node may determine node groups for that subset of second nodes, excluding second nodes not part of that subset when grouping second nodes of the subset into multiple node groups. Additionally, the scheduling node may determine a timing schedule based on the node groups for that subset, and the first node may transmit signals to the subset of second nodes via the first target intelligent reflecting device according to the timing schedule. Similar node grouping, timing scheduling, and transmitting actions may be performed for other subsets of second nodes corresponding to other target intelligent reflecting devices.

Additionally, for embodiments where a region determination node determines surface element groups for surface elements of an intelligent reflecting device 124, the region determination node may determine surface element regions based on the sets of intelligent reflecting devices, such as on an intelligent reflecting device-by-intelligent reflecting device basis. For example, suppose the first node is to communicate with a group of second nodes via multiple intelligent reflecting devices 124. Further, suppose that the intelligent reflecting device selection node determines that the first node is to communicate with only a subset of the group of second nodes via a first target intelligent reflecting device. In turn, the region determination node may determine the surface element regions for the first target intelligent reflecting device based on communication parameters and/or surface element groups associated with only that subset of second nodes, without taking into consideration second nodes of the group not part of that subset.

Additionally, in various of these embodiments that determine target intelligent reflecting devices, the intelligent reflecting device selection node may choose a target intelligent reflecting device for a given second node based on signal power arriving at the intelligent reflecting device 124. To do so, the first node may transmit one or more signals to the multiple intelligent reflecting devices 124 for the given second node. In response to receipt of the signals, each of the multiple intelligent reflecting devices 124 may feedback received or arrival signal power to the first node. In some embodiments, for a transmission to a given intelligent reflecting device for a given second node, if the received signal power received from the given intelligent reflecting device is above a predetermined threshold (e.g., 20%), then the intelligent reflecting device selection node may identify the given intelligent reflecting device as a target intelligent reflecting device via which the first node is to communicate in order to transmit signals to the given second node. In other example embodiments, the intelligent reflecting device selection node may select the target intelligent reflecting device for a given second node as the intelligent reflecting device that has the highest received signal power, or a predetermined number of highest received signal powers, among the received signal powers for the plurality of intelligent reflecting devices.

In other example embodiments, the first node may communicate with a plurality of second nodes via multiple intelligent reflecting devices. For such embodiments, the multiple intelligent reflecting devices may be a chain intelligent reflecting devices, where a first intelligent reflecting device in the chain is a first intelligent reflecting device to reflect a set of signals from the first node, and a last intelligent reflecting device in the chain is a last intelligent reflecting device in the chain to reflect the set of signals before the set signals is received by the second nodes. In addition, a channel from the first node to the second nodes via the multiple intelligent reflecting devices may include multiple channel segments, where each channel segment is between two nodes, including a channel segment between the first node and the first intelligent reflecting device of the chain, channel segments between the last intelligent reflecting device of the chain and the second nodes, and one or more channel segments, each between a respective two of the multiple intelligent reflecting devices of the chain.

For some embodiments, the surface element group determination node may determine surface element groups for each of the one or more second nodes for each intelligent reflecting device in the chain. For other embodiments, the surface element group determination node may determine surface element groups for each of the one or more second nodes for only the last intelligent reflecting device in the chain. Additionally, for embodiments where the intelligent reflecting devices each have sensing ability, the surface element group node may determine channel state information for each channel segment based on channel estimation algorithms, such as LS or MMSE, as previously described. The surface element group determination node may also use compressive sensing, for at least some embodiments. Additionally, for at least some embodiments, the surface element group determination node may perform channel estimation to determine channel state information for intelligent reflecting devices in the chain, other than the first intelligent reflecting device, in different time slots.

Additionally, for embodiments where the last intelligent reflecting device has sensing ability but the first intelligent reflecting device does not, the channel state information for the channel segment between the last intelligent reflecting device and the second node may be obtained through channel estimation, such through use of LS or MMSE, and/or compressive sensing, while the channel state information for the other channel segments may be obtained through repetition of beam training or beam sweeping processes, such as previously described, for the other channel segments.

In addition, for embodiments where the first intelligent reflecting device has sensing ability, but the last intelligent reflecting device does not, the channel state information for the channel segments other than the channel segment between the first node and the first intelligent reflecting device, may be determined through repetition of beam training or beam sweeping. For example, a codebook for the first node and one or more of the intelligent reflecting devices may be fixed, and a repetition procedure using different beam pairs may be used in order to determine a desired beam pair, from which the channel state information may be obtained.

Also, in various embodiments where the first intelligent reflecting device communicates with a plurality of second nodes via a chain of intelligent reflecting devices, the node group assignment node may determine node groups based one or more communication parameters between the plurality of second nodes and the last intelligent reflecting device of the chain. For example, the node group assignment node may refrain from forming node groups based on communication parameters associated with any of the other intelligent reflecting devices in the chain except the last intelligent reflecting device. In addition or alternatively, the region determination node may determine surface element regions for only the last intelligent reflecting device in the chain. For example, for each of the other intelligent reflecting devices, other than the last intelligent reflecting device, the surface elements of the other intelligent reflecting device may be configured as one whole or integral region that reflects according to one reflection angle to collectively service the plurality of second nodes. In contrast, the last intelligent reflecting device may have its surface elements separated into different surface element regions, each independently controlled and set with associated reflection angles to independently reflect signals to respective second nodes associates with each of the surface element regions, as previously described.

Accordingly, for such embodiments, each of the intelligent reflecting devices in the chain may have an associated phase shift matrix that determines the phase shifts of the surface elements. The other intelligent reflecting devices, other than the last intelligent reflecting device, may each have an associated phase shift matrix that configures the phase shifts of all of the surface elements of the surface so that the surface elements operate as a single unit, collectively reflecting according to a single reflection angle. On the other hand, the last intelligent reflecting device may have an associated phase shift matrix that corresponds to multiple surface element regions of the surface of the last intelligent reflecting device, and that sets the phase shifts of the surface elements of the different surface element regions so that the different surface element regions reflect with multiple independently set reflection angles according to phase shifts determined by the phase shift matrix.

Configurations that perform node grouping, surface element region determination, and/or control of the reflection angles/phase shifts independently for the different surface element regions for only the last intelligent reflecting device of the chain may reduce the overall complexity of the communication between the first node and the plurality of nodes, thereby rendering use of a chain of intelligent reflecting device more practical and or easier to implement.

The description and accompanying drawings above provide specific example embodiments and implementations.

The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, the method comprising:
    determining, by a first node, a plurality of surface element regions of a plurality of surface elements of an intelligent reflecting device based on a plurality of node groups of a plurality of second nodes, wherein a first set of surface element regions is determined for a first node group of the plurality of node groups and a second set of surface element regions is determined for a second node group of the plurality of node groups;
    determining a number of the plurality of surface element regions into which to divide the plurality of surface elements based on a number of the plurality of second nodes communicating with the first node via the intelligent reflecting device, wherein the number of the plurality of surface element regions is directly proportional to the number of the plurality of second nodes;
    independently setting, by the first node, communication parameters for respective communications between the first node and each of the plurality of surface element regions; and
    transmitting, by the first node, signals to the plurality of second nodes via the plurality of surface element regions according to the independent setting of the communication parameters.

2. The method of claim 1, further comprising:
    assigning, by the first node, each of the plurality of second nodes to one or more of the plurality of surface element regions.

3. The method of claim 2, wherein assigning each of the plurality of second nodes to one or more of the plurality of surface element regions is based on channel state information.

4. The method of claim 2, further comprising:
    determining, by the first node, a plurality of surface element groups for the plurality of second nodes, each of the plurality of surface element groups comprising at least one surface element of a surface of the intelligent reflecting device, and each surface element group is associated with a respective one of the plurality of second nodes,
    wherein assigning each of the plurality of second nodes to one or more of the plurality of surface element regions is based on the plurality of surface element groups.

5. The method of claim 2, wherein assigning each of the plurality of second nodes to one or more of the plurality of surface element regions is based on one or more target communication parameters.

6. The method of claim 2, wherein assigning each of the plurality of second nodes to one or more of the plurality of surface element regions is based on location information associated with the plurality of second nodes.

7. The method of claim 1, further comprising:
    determining, by the first node, a plurality of surface element groups for the plurality of second nodes, each of the plurality of surface element groups comprising at least one surface element of a surface of the intelligent reflecting device, and each surface element group is associated with a respective one of the plurality of second nodes,
    wherein determining the plurality of surface element regions is based on the plurality of surface element groups.

8. The method of claim 7, wherein at least one of a size, shape, or position of one of the plurality of surface element regions is based on a surface element group included in the one of the plurality of surface element regions.

9. The method of claim 7, wherein the plurality of surface element groups comprises two surface element groups comprising an overlapping surface element,
wherein determining the plurality of surface element regions based on the plurality of surface element groups comprises assigning the overlapping surface element to one of the plurality of surface element regions based on one or more overlap criterion.

10. The method of claim 1, wherein determining the plurality of surface element regions of the plurality of surface elements of the intelligent reflecting device comprises:
determining, by the first node, sizes of the plurality of surface element regions based on location information of the second nodes.

11. The method of claim 10, wherein determining sizes of the plurality of surface element regions based on the location information of the second nodes comprises:
allocating, by the first node, more surface elements for a first surface element region for a first one of the second nodes than for a second surface element region for a second one of the second nodes based on the first one of the second nodes being located farther from the intelligent reflecting device than the second one of the second nodes.

12. The method of claim 1, wherein determining the plurality of surface element regions of the plurality of surface elements of the intelligent reflecting device comprises:
determining, by the first node, sizes of the plurality of surface element regions based on one or more target communication parameters.

13. The method of claim 12, wherein determining sizes of the plurality of surface element regions based on the one or more target communication parameters comprises:
allocating, by the first node, more surface elements for a first surface element region for a first one of the second nodes than for a second surface element region for a second one of the second nodes based on the first one of the second nodes having a higher target communication parameter than the second one of the second nodes.

14. The method of claim 1, wherein the plurality of second nodes comprises a subset of a group of second nodes, the intelligent reflecting device comprising a target intelligent reflecting device of a plurality of intelligent reflecting devices, the method further comprising:
determining, by the first node, the target intelligent reflecting device, from among the plurality of intelligent reflecting devices, for the subset based on arrival signal power at the target intelligent reflecting device,
wherein determining the plurality of surface element regions is based on surface element groups associated with the subset.

15. The method of claim 1, wherein the intelligent reflecting device comprises a last intelligent reflecting device of a chain of multiple intelligent reflecting devices via which the first node communicates with the plurality of second nodes.

16. The method of claim 1, wherein the communication parameters comprise at least one of beams for the respective communications or reflection angles for the respective communications.

17. An apparatus comprising:
a memory storing a plurality of instructions; and
a processor configured to execute the plurality of instructions, and upon execution of the plurality of instructions, is configured to:
determining, by a first node, a plurality of surface element regions of a plurality of surface elements of an intelligent reflecting device based on a plurality of node groups of a plurality of second nodes, wherein a first set of surface element regions is determined for a first node group of the plurality of node groups and a second set of surface element regions is determined for a second node group of the plurality of node groups;
determining a number of the plurality of surface element regions into which to divide the plurality of surface elements based on a number of the plurality of second nodes communicating with the first node via the intelligent reflecting device, wherein the number of the plurality of surface element regions is directly proportional to the number of the plurality of second nodes;
independently setting, by the first node, communication parameters for respective communications between the first node and each of the plurality of surface element regions; and
transmitting, by the first node, signals to the plurality of second nodes via the plurality of surface element regions according to the independent setting of the communication parameters.

18. A method for wireless communication, the method comprising:
determining, by a first node, a plurality of surface element regions of a plurality of surface elements of an intelligent reflecting device by determining sizes of the plurality of surface element regions based on location information of second nodes or based on one or more target communication parameters by: allocating, by the first node, more surface elements for a first surface element region for a first one of the second nodes than for a second surface element region for a second one of the second nodes based on the first one of the second nodes being located farther from the intelligent reflecting device or having a higher target communication parameter than the second one of the second nodes;
determining a number of the plurality of surface element regions into which to divide the plurality of surface elements based on a number of a plurality of second nodes communicating with the first node via the intelligent reflecting device, wherein the number of the plurality of surface element regions is directly proportional to the number of the plurality of second nodes;
independently setting, by the first node, communication parameters for respective communications between the first node and each of the plurality of surface element regions; and
transmitting, by the first node, signals to a plurality of second nodes via the plurality of surface element regions according to the independent setting of the communication parameters.

* * * * *